(12) United States Patent
Fandrianto et al.

(10) Patent No.: US 6,965,644 B2
(45) Date of Patent: Nov. 15, 2005

(54) PROGRAMMABLE ARCHITECTURE AND METHODS FOR MOTION ESTIMATION

(75) Inventors: Jan Fandrianto, Los Gatos, CA (US); Chi Shin Wang, Los Altos Hills, CA (US); Sehat Sutardja, Cupertino, CA (US); Hedley K. J. Rainnie, Santa Clara, CA (US); Bryan R. Martin, Santa Clara, CA (US)

(73) Assignee: 8×8, Inc., Santa Clara, CA (US)

( * ) Notice: Subject to any disclaimer, the term of this patent is extended or adjusted under 35 U.S.C. 154(b) by 724 days.

(21) Appl. No.: 09/797,035

(22) Filed: Mar. 1, 2001

(65) Prior Publication Data

US 2001/0046264 A1 Nov. 29, 2001

Related U.S. Application Data

(63) Continuation of application No. 09/098,106, filed on Jun. 16, 1998, now Pat. No. 6,441,842, which is a continuation of application No. 09/005,053, filed on Jan. 9, 1998, now Pat. No. 6,124,882, which is a continuation-in-part of application No. 08/908,826, filed on Aug. 8, 1997, now Pat. No. 5,790,712, which is a continuation of application No. 08/658,917, filed on May 31, 1996, now abandoned, which is a continuation of application No. 08/303,973, filed on Sep. 9, 1994, now abandoned, which is a continuation of application No. 07/838,382, filed on Feb. 19, 1992, now Pat. No. 5,379,351.

(51) Int. Cl.[7] ............................................. H04N 7/12
(52) U.S. Cl. .............................. 375/240.16; 375/240.17
(58) Field of Search ........................ 375/240.16, 240.17; 348/699–700; 382/234, 236, 238, 247; 386/109, 111; 708/402, 407; 711/149

(56) References Cited

U.S. PATENT DOCUMENTS 4,864,393 A * 9/1989 Harradine et al. .......... 348/699
5,083,202 A * 1/1992 Parke .......................... 348/699
5,216,501 A * 6/1993 Ando .......................... 348/416.1

(Continued)

OTHER PUBLICATIONS

Yang et al, "A Family of VLSI Designs for the Motion Compensation Block–Matching Algorithm", IEEE Transactions on Circuits and Systems, vol. 36, No. 10, pp. 1317–1325, Oct. 1989.*

Primary Examiner—Vu Le

(57) ABSTRACT

A programmable motion estimator includes one dual ported memory for storing an image block, the prediction error, and a temporary block used in interpolation, and a pixel-group random access dual ported memory for storing a search window. The two ports of the two memories are selectively applied to an arithmetic logic unit, or ALU, through a multiplexer. One output of the ALU provides an absolute difference, which is furnished to a tree adder. Another output of the ALU provides an average value or a difference value, as selected, which is routed to the inputs of the image memory and the search memory. In motion vector searching, the ALU performs pixel absolute difference arithmetic using the pixel groups from the image memory and from the search memory, and determines a sum of absolute differences in the tree adder. In half pixel interpolation, the ALU performs pixel averaging arithmetic using pixel groups from the search memory, and writes back to the search memory. In quarter pixel interpolation, the ACU performs pixel averaging arithmetic using pixel groups from the image and search memories, and writes back to the search memory. In some quarter pixel interpolations, temporary interpolated blocks from the image memory are used to interpolated quarter pixel blocks. These temporary blocks are obtained by pixel averaging in the ALU using pixel groups from the search memory. In error prediction determination, the ALU performs pixel subtraction using the pixel groups from the image memory and from the search memory, and writes back to the image memory.

29 Claims, 18 Drawing Sheets

U.S. PATENT DOCUMENTS 5,379,351 A * 1/1995 Fandrianto et al. ......... 382/236
5,790,712 A * 8/1998 Fandrianto et al. ......... 382/276
6,124,882 A * 9/2000 Voois et al. ............. 348/14.08
6,441,842 B1 * 8/2002 Fandrianto et al. ...... 348/14.13

* cited by examiner

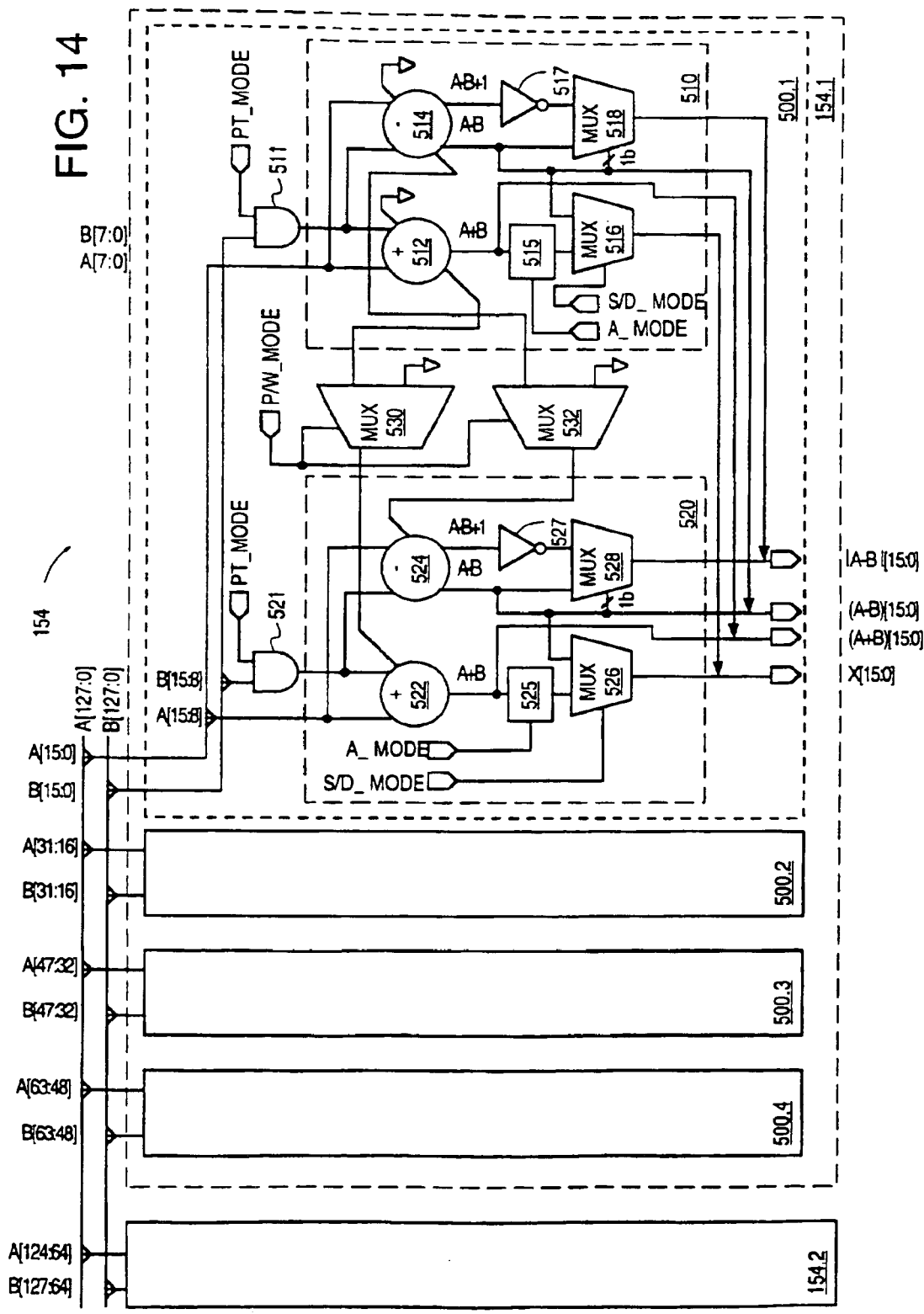

PROGRAMMABLE ARCHITECTURE AND METHODS FOR MOTION ESTIMATION

CROSS REFERENCES TO RELATED APPLICATIONS

This is a continuation of U.S. patent application Ser. No. 09/098,106, filed on Jun. 16, 1998, (now U.S. Pat No. 6,441,842), which is a continuation-in-part of U.S. patent application Ser. No 09/005,053, filed on Jan. 9, 1998(now U.S. Pat. No. 6,124,882), which is a continuation-in-part of U.S. patent application Ser. No. 08/908,826, filed on Aug. 8, 1997, (now U.S. Pat. No. 5,790,712), which is a continuation of U.S. patent application Ser. No. 08/658,917, filed May 31, 1996 (now abandoned), which is a continuation of U.S. patent application Ser. No. 07/303,973, filed on Sep. 9, 1994 (now abandoned), which is a continuation of U.S. patent application Ser. No. 07/838,382, filed on Feb. 19, 1992, (now U.S. Pat. No. 5,379,351).

BACKGROUND

1. Field of the Invention

The present invention relates generally to motion estimation, and more specifically to a programmable architecture and methods for motion vector and/or prediction error determination.

2. Description of Related Art

Applications such as video telephone, digital television, and interactive multimedia using such digital storage technology as CD-ROM, digital audio tape, and magnetic disk require digital video coding, or video compression, to achieve the necessary high data transfer rates over relatively low bandwidth channels. Various standards have been proposed for video coding. A standard for the storage and transmission of still images has been adopted by the International Standards Organization ("ISO"), Joint Photographic Expert Group ("JPEG"); see "JPEG Technical Specification, Revision 5," JPEG-8-R5, January 1980. A standard for digital television broadcast coding at 30/45 Mb/s is under consideration; see CCIR-CMTT/2, "Digital Transmission of Component-Coded Television Signals at 30–34 Mb/s and 45 Mb/s Using the Discrete Cosine Transform," Document CMTT/2-55. A standard for video telephony and video conferencing at 64 to 1920 kb/s has been adopted by the International Consultative Committee for Telephone and Telegraph ("CCITT"); see "Draft Revision of Recommendation H.261, "Document 572, CCITT SG XV, Working Party XV/1, Spec. Grp. on Coding for Visual Telephony. A standard for storage applications below 1.5 Mb/s, which are similar to the applications targeted by the CCITT standard, is under consideration by the Moving Picture Experts Group ("MPEG") of the ISO. Video coding algorithms have been proposed as contributions to the standardization activity of ISO/MPEG; see Wong et al., "MCPIC: A Video Coding Algorithm for Transmission and Storage Applications," IEEE Communications Magazine, November 1990, pp. 24–32.

Many video coding techniques include a predictive mode that realizes data compression between two different video frames by identifying how a frame is unlike a preceding frame. In predictive mode, the frame is represented in terms of a set of vectors of the displacement of respective groups of pixels in the frame relative to their position in the preceding frame, known as motion vectors; and difference information representing the degree of difference between the displaced pixels and the corresponding pixels in the preceding frame. Because the amount of data in the set of motion vectors and difference information tends to be considerably less than the amount of data in the frame itself, the two frames are adequately represented by the considerably less data present in the preceding frame plus the motion vectors and difference information. When the frame is required in uncompressed form, it is reconstructed by applying the motion vectors and difference information to the preceding frame.

Because effective video coding requires the intimate integration of digital video compression technology, integrated circuit technology, and digital storage media, and as various standards for digital video compression exist and are proposed, a need has arisen for a flexible, high performance, low implementation cost programmable architecture for motion estimation.

SUMMARY OF THE INVENTION

The present invention is advantageous in many respects. For example, the programmability aspect of the present invention enables support of future algorithms, and allows the addition of customer-proprietary optimizations and algorithms.

These and other advantages are achieved in the present invention, which in one embodiment is an apparatus for performing an arithmetic operation on groups of pixels under program control having two memories and an arithmetic unit. One of the memories has a plurality of addressable locations N pixels in width and a read port, and N pixels from any one of the addressable locations are accessible in parallel on the read port during an address cycle. The other memory has a plurality of addressable locations greater than N pixels in width and a read port, and any N contiguous pixels from any one of the addressable locations are accessible in parallel on the read port during an address cycle. The arithmetic unit is connected to the two memory ports.

In another embodiment, a memory is included that has a plurality of addressable locations greater than N pixels in width and two read ports, and any N contiguous pixels from any one of the addressable locations are accessible in parallel on each of the read ports during an address cycle. The arithmetic unit is connected to the two ports.

In an embodiment of a pixel-group random access memory, a memory array has a plurality of addressable locations N pixels in width and a read port, and N pixels from any one of the addressable locations and N pixels from an adjacent addressable location are accessible in parallel on the read port during an address cycle. A shifter has its input coupled to the read port, and provides N pixels on its output.

In several method embodiments, groups of pixels are read from two memory ports, at least one of which is pixel-group random addressable, and used to determine sums of absolute differences, pixel differences, and pixel averages.

BRIEF DESCRIPTION OF THE DRAWINGS

In the Figures, where like reference numerals indicate like parts,

FIG. 14 is a block schematic diagram of an arithmetic logic unit useful in the datapath of the architecture of FIG. 2.

DETAILED DESCRIPTION OF THE PREFERRED AND OTHER EMBODIMENTS

Figure 1:
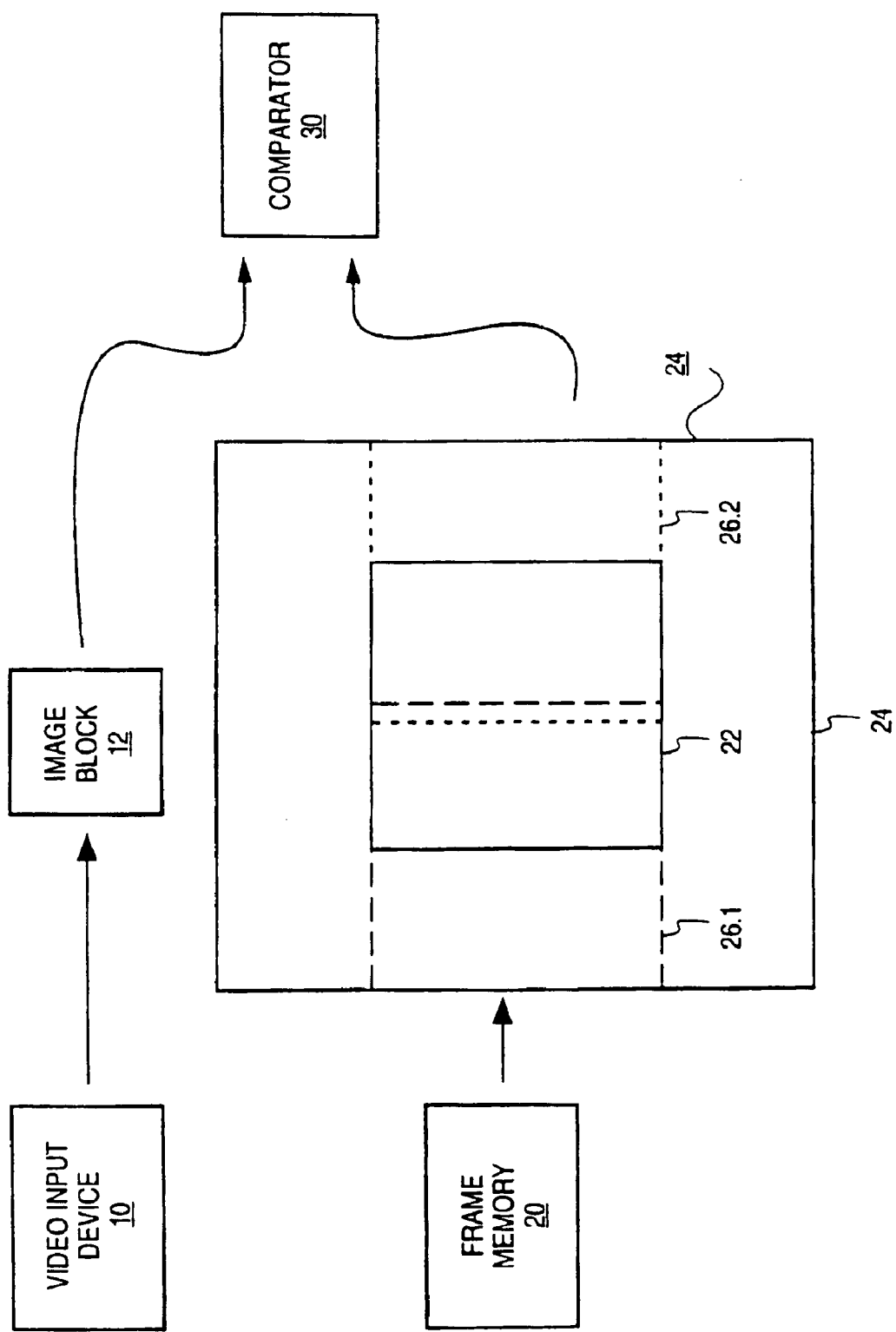
FIG. 1 is a schematic diagram showing the relationship between an image block and search blocks within a search window.

Motion vector searching typically involves comparing an input or image block with search blocks within a search window centered on the frame location of the image block. The image block 12 shown in FIG. 1 is obtained, for example, from a video input device 10, which may be a video camera, video transmission, preframe video memory, or the like. The image block 12 may be any convenient size; 16.times.16 pixels is exemplary. The search window 24 is obtained typically from a frame memory 20, in which a previously processed frame is stored. The search window 24 is approximately centered on the location of the image block 12. In FIG. 1, the search block 22 (shown in solid line) represents the zero displacement search block. The search blocks of the search window 24 are generally of the same size as the image block 12. The search window 24 is defined by an illustrative displacement of the search block 22 eight pixels to the left (block 26.1, outlined in a fine phantom line) and seven pixels to the right (block 26.2, outlined in a coarse phantom line), seven pixels up, and eight pixels down. In this embodiment, the size of the search window 24 for a full pixel search is 31.times.31. A larger search window 24 may be used if more memory is available.

The image block 12 is successively compared in comparator 30 with the search blocks in the search window 24, and is represented for storage or transmission by displacement data, or motion vectors, and by difference information, or prediction error data, based on the closest matching search block in the search window 24.

Typically, although not necessarily, luminance information is used for motion vector searching. The size of the basic luminance information unit is somewhat discretionary, and generally depends on the application and design choice. For example, in the embodiment of a vision processor described in detail in the above-referenced patent document of Fandrianto et al. entitled "Vision Processor," which is incorporated herein by reference, the basic video information processing unit, or macroblock, is a 16.times.16 pixel luminance matrix.

Figure 2:
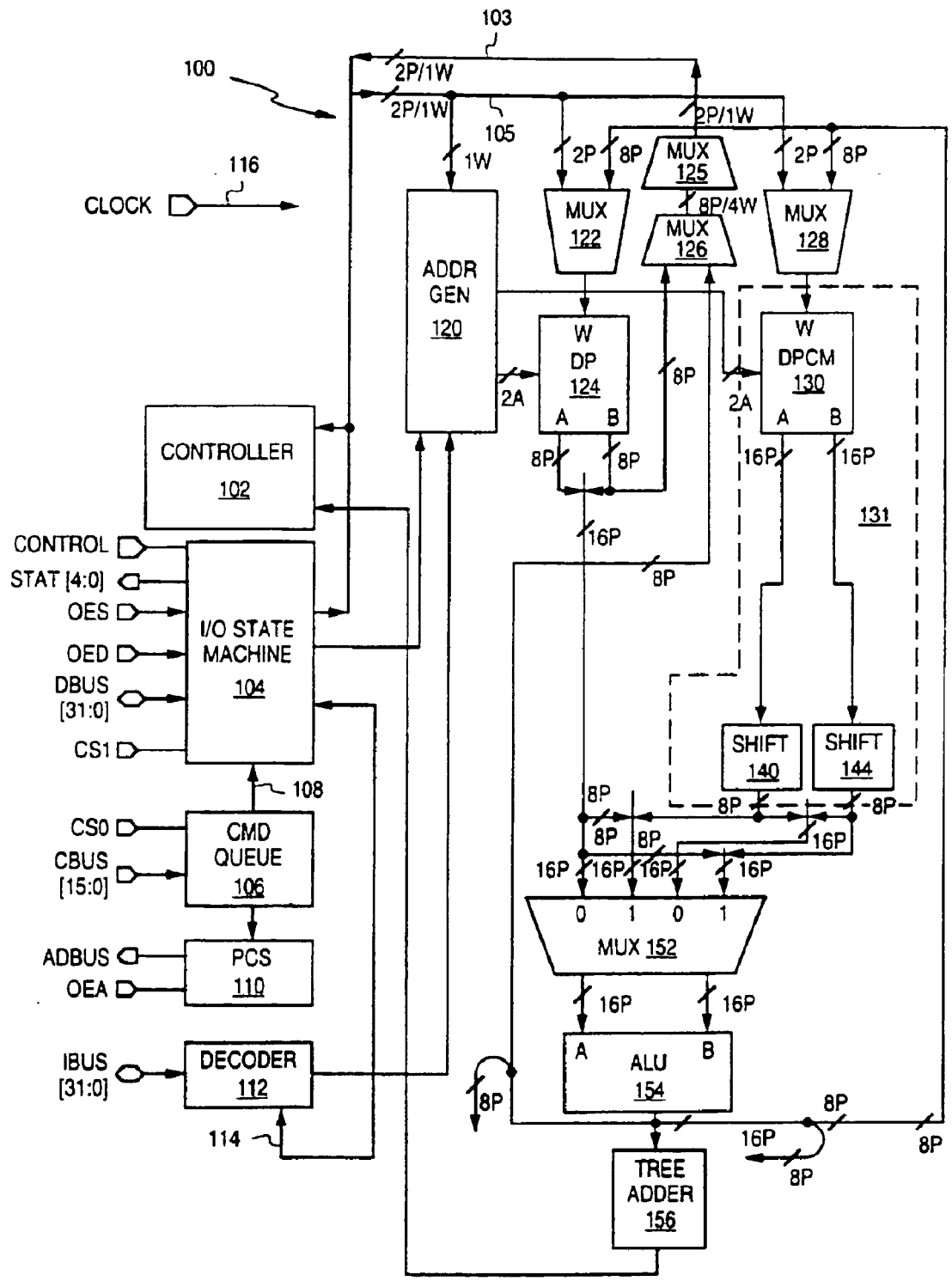
FIG. 2 is a block diagram showing a motion estimation architecture in accordance with the present invention.

An illustrative programmable architecture 100 for implementing motion vector searching is illustrated in FIG. 2.

Rapid and efficient motion vector searching is accommodated by two high-speed, multi-ported register files in the datapath of the architecture 100: an image block, best match block memory conveniently referred to as DP memory 124, and a search memory conveniently referred to as DPCM memory 130. The memories 124 and 130 are configured in an advantageous manner based on the desired video information block size and on the critical operations required of the architecture 100 in executing certain widely accepted current standards and possible future standards. Other important data path elements for motion vector estimation include two funnel shifters 140 and 144, an arithmetic logic unit ("ALU") 154, and a tree adder 156. Shifter 140 is connected to port A of the DPCM memory 130, and shifter 144 is connected to port B of the DPCM memory 130. ALU 154 receives pixel data items from shifters 140 and 144 and from the DP memory 124.

Figure 3A:
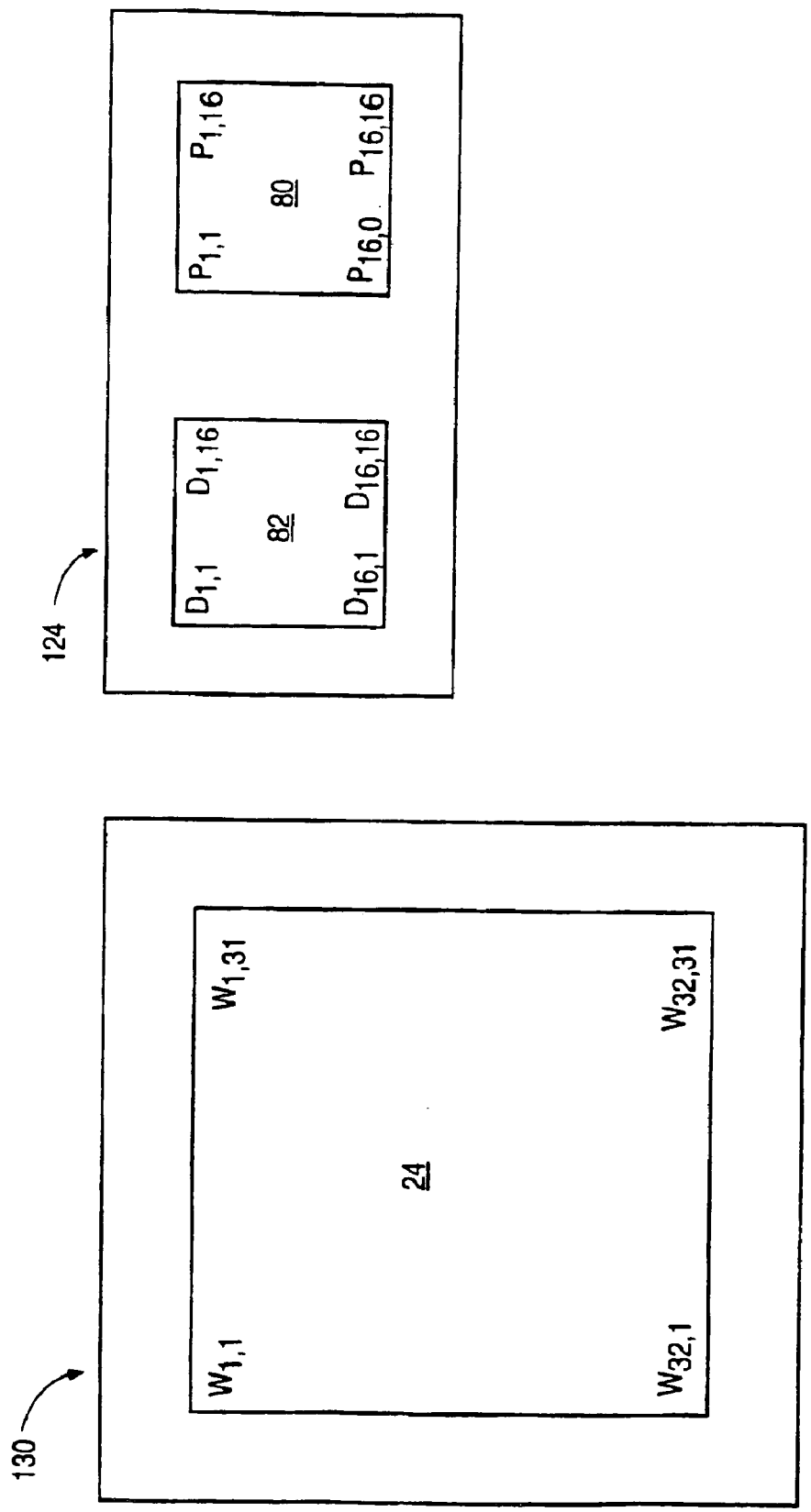
FIG. 3A is a block diagram representing a memory arrangement for full pixel motion estimation.

The video information stored in the DP memory 124 and the DPCM memory 130 are stored as blocks. A basic configuration for an motion vector searching on an integral full pixel basis is shown in FIG. 3A. Two blocks are stored in the DP memory 124, a "P" or preframe block 80 and a "D" block 82. Illustratively, each block is 16.times.16 pixels, so that the minimum memory size is 16.times.32.times.8 bits, for example. The entire search window 24 is copied into the DPCM memory 130 from frame memory 20. Illustratively, to contain the search window 24, the size of DPCM memory 130 need be 31.times.31.times.8 bits.

For motion vector searching on a full integral pixel basis, the best block match is determined among all search blocks in the search window 24 by a minimum sum of absolute block differences criteria. For each search block, a minimum sum of absolute block differences is determined in accordance with the expression $$\text{Sum.sub.ij (abs val (W.sub.Xo+i,Yo+j-P.sub.ij))}$$

in which P.sub.ij (i,j=1, . . . , 16) are the pixels of the image block 12 stored in P block 80 of DP memory 124, and W.sub.Xo+i,Yo+j (i,j=1 , . . . , 16) are the pixels of a given search block having an origin X.sub.o,Y.sub.o in the search window 24, where X.sub.o,Y.sub.o are in the illustrative range of −8 through +7. Note that the center search block 22 (FIG. 1) is at X.sub.o,Y.sub.o=0,0.

The minimum sum of absolute block differences of expression (1) is implemented in the architecture of FIG. 2 as follows, although other implementations may be realized. The image block 12 is read into the P block 80, while the entire search window 24 is read from an external memory (not shown) into the DPCM memory 130, overwriting any previously stored search window. For each search block in the search window 24, the differences between the pixels stored in P block 80 and the current search block is determined in ALU 154, and summed by tree adder 156. Two hundred fifty-six differences are computed per each sum. The sum for the current search block is compare with the minimum sum of absolute block differences stored in a register (not shown) in controller 102, and substituted therefor if less, along with the search block identity. These steps are repeated until all search blocks of the search window 24 stored in DPCM memory 130 have been compared with the image block 12 stored in the P block 80 of the DP memory 124, at which point the minimum sum of absolute block differences and the search block to which it corresponds, known as the best match block, have been identified.

If no half-pixel or finer interpolation is to be done, the motion vector is known simply from the spatial identity of the best match block, while the prediction error is determined as follows. The prediction error is the difference between the best match block stored relative to location W.sub.Xb,Yb and the image block stored in P block 80, or $$PE.sub.ij\ .DELTA.\ W.sub.Xb+i,Yb+j-P.sub.ij \qquad (2)$$

for i,j=1, . . . , 16. This calculation is performed in the ALU 154, and the results, the prediction error, are written into the D block 82 of the DP memory 124. Note that the calculation for expression (2) was previously performed in the implementation of expression (1), and could have been written into the D block 82 of the DP memory 124 or into other memory rather than recalculated. In the architecture of FIG. 2, however, performing the calculation for expression (2) is generally faster than multiply writing into the D block 82 during the calculation of expression (1) while avoiding the need for additional memory.

In the case of integral pixel motion estimation, only part of the DPCM memory 130 needs to be updated, as the search area for the next preframe block typically overlaps with the search area of the current preframe block. For example, where the preframe block size is 16.times.16, typically only 16 new columns of the DPCM memory 130 need to be brought in from the external memory. This compares favorably with the alternative of bringing in 31 new columns for every new search area. As the search area of the DPCM memory 130 increases, this technique becomes increasingly useful for reducing the external memory bandwidth requirements and overall system cost. The PRAM (Pixel-group Random Access Memory) addressing mode allows addressing the DPCM memory 130 in such a way that any random N contiguous pixels can be accessed in parallel from a memory array of size greater than N pixels in width. It will be appreciated that a minor additional complexity introduced by bringing in only part of the new search area is that the starting address of the search area shifts by a fixed amount in the horizontal direction.

For improved prediction accuracy, half-pixel estimation and quarter-pixel estimation are performed after the integral pixel estimation. In motion vector searching with one-half or one-quarter pixel accuracy, the DPCM memory 130 is used to store a search window 24 that is in large part an interpolated search matrix generated from a best match search block from a less accurate estimation operation.

Figure 3B:
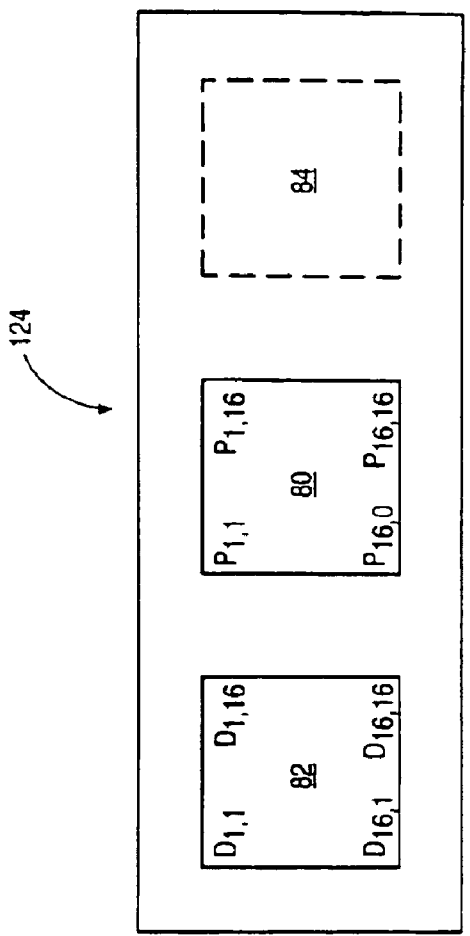
FIG. 3B is a block diagram representing a memory arrangement for one-half and one-quarter pixel interpolation.
Figure 3B:
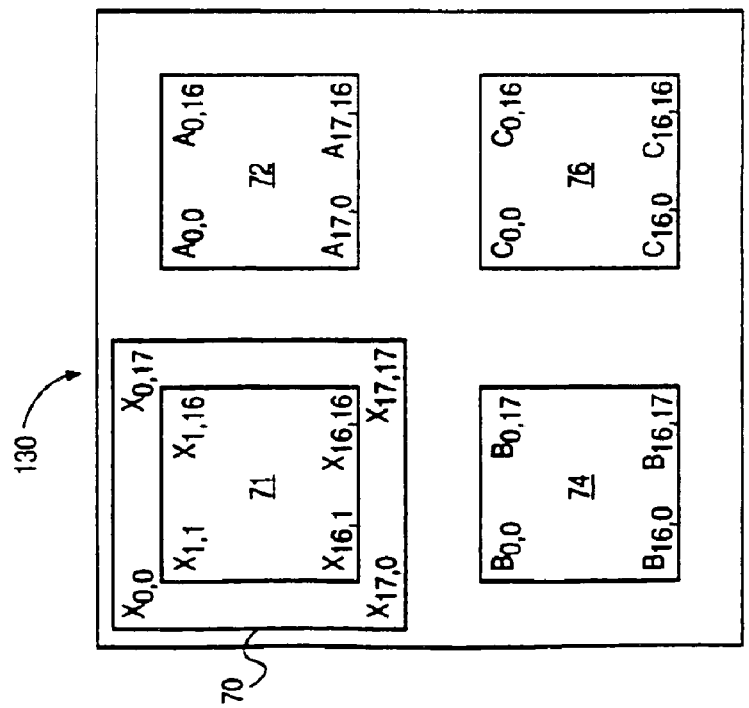

A basic configuration of the DP memory 124 and the DPCM memory 130 for half-pixel estimation is shown in FIG. 3B. As in full pixel estimation, two blocks are stored in the DP memory 124, the P block 80 and the D block 82, and each block is 16.times.16 pixels. Somewhat more than four blocks are stored in the DPCM memory 130, however. An "X" block 70 receives the best match search block and surrounding pixels loaded from the frame memory 20 or from the block stored relative to the location W.sub.Xb,Yb. "A" block 72, "B" block 74, and "C" block 76 are interpolated from the X block 70 and used in half pixel and, later, quarter pixel estimation, as described below. Illustratively, the X block 70 is 18.times.18 pixels, the A block 72 is 18.times.17 pixels, the B block 74 is 17.times.18 pixels, and the C block 76 is 17.times.17 pixels, so that the preferable minimum memory size of the DPCM memory 130 for half-pixel estimation is 35.times.35.times.8 bits, for example.

Figure 4:
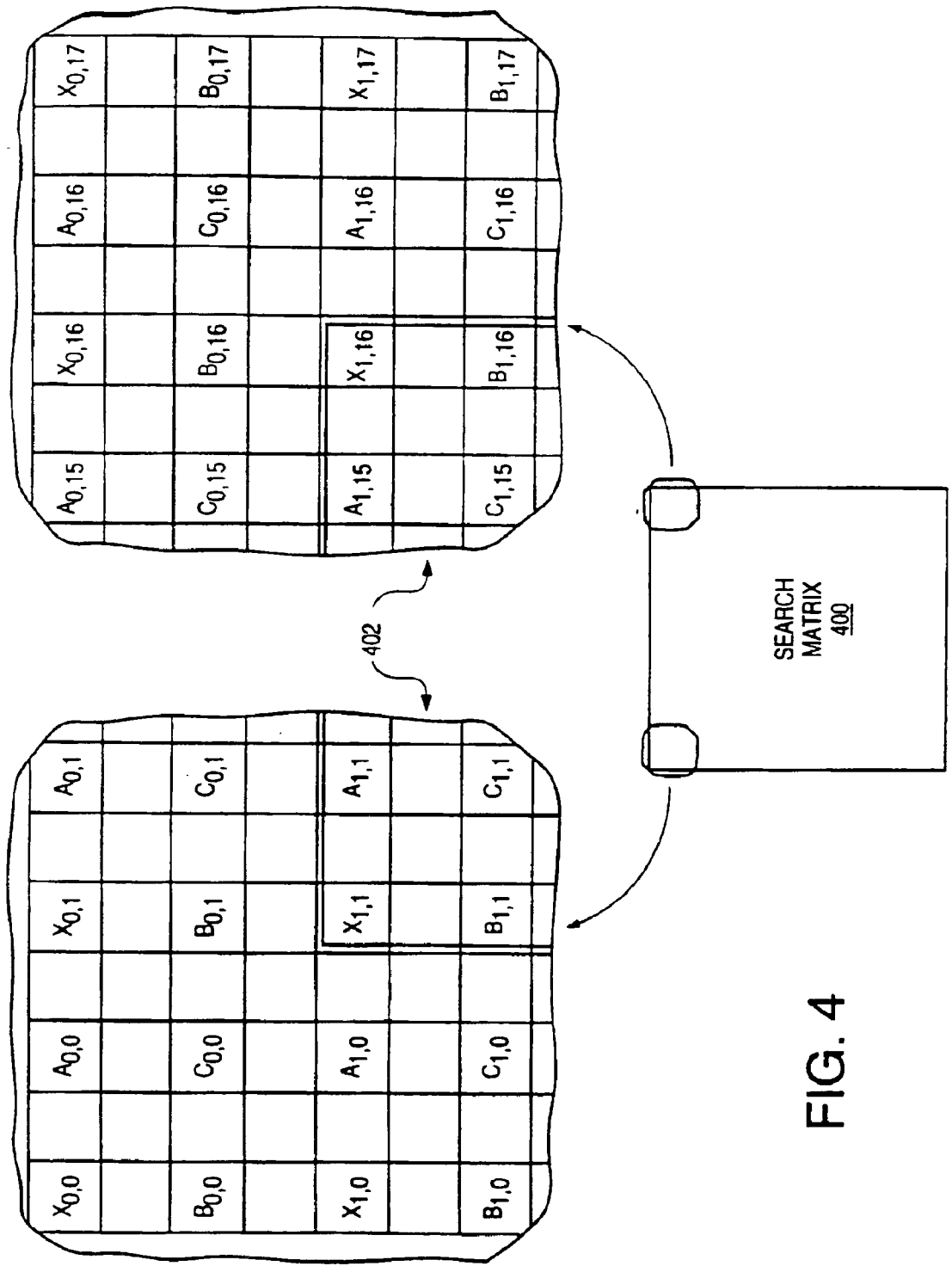
FIGS. 4 and 5 are pictorial representations of full pixel positions of a search matrix and their relationship to interpolated pixels at one-half and one-quarter pixel displacements.

A conceptual representation of an illustrative interpolated search matrix 400 is shown in FIG. 4. The matrix 400 comprises four completely interleaved matrices corresponding to blocks 70, 72, 74 and 76, respectively containing pixels X.sub.r,c, A.sub.r,c, B.sub.r,c, and C.sub.r,c, wherein "r" is the row number and "c" is the column number. The number of rows and columns in each of the interleaved X, A, B and C matrices is dependent on the application and to some extent design choice. In an illustrative arrangement useful in the vision processor disclosed in the aforementioned patent document of Fandrianto et al. entitled "Vision Processor," the 16.times.16 pixels of a best match search block 71 from a motion vector search on an integral full pixel basis are shown as matrix elements X.sub.1,1 through X.sub.16,16, bounded within the region 402 in FIG. 4 by a double line. Note that the full X block 70 includes X.sub.r,c (r=0, . . . , 18; c=0, . . . , 18) pixels. Pixels X.sub.0,0 through X.sub.0,17, X.sub.0,0 through X.sub.17,0, X.sub.17,0 through X.sub.17,17, and X.sub.0,17 through X.sub.17,17 are adjacent the best match search block 71 and are copied into X block 70 of the DPCM memory 130 to allow interpolation of fractional pixel positions about all of the pixels of the best match search block 71. Pixels A.sub.r,c (r=0, . . . , 17; c=0, . . . , 16) of the A block 72 are horizontally interpolated at half-pixel locations, from the X block 70. Pixels B.sub.r,c (r=0, . . . , 16; c=0, . . . , 17) of the B block 74 are vertically interpolated at half-pixel locations, from the X block 70. Pixels C.sub.r,c (r=0, . . . , 16; c=0, . . . , 16) are pixels interpolated at half-pixel locations, preferably vertically from the A matrix 72 or horizontally from the B matrix 74, but may also be interpolated diagonally from the X matrix 70. The D block 82 and the P block 80 stored in the DP memory 124 are each 16.times.16 pixels. Block 70 was present during the motion vector search on an integral full pixel basis, and is merely relocated in the DPCM memory 130, to reduce external memory bandwidth.

The A block 72, the B block 74, and the C block 74 are interpolated as follows. The A block 72 is formed by progressive horizontal interpolations of the X block 70. A pixel group from a row of the X block 70 is addressed on both ports A and B of the DPCM memory 130. Accordingly, the same pixel group is loaded into both shifters 140 and 144. One of the pixel groups is shifted one pixel; for example, the pixel group in funnel shifter 144 is shifted one pixel, or eight bits, to the right. The unshifted output from funnel shifter 140 and the one-pixel right shifted output from the funnel shifter 144 are presented to respectively the A and B inputs of the ALU 154, which performs a divide by two and a rounding off. The result is routed from the ALU 154 into appropriate address locations of the A block 74 in the DPCM memory 130. This process is continued until the entire horizontal interpolation of the X block 70 is complete and the entire A block 72 created.

The B block 74 is formed by progressive vertical interpolations of the X block 70. A pixel group from a row of the X block is addressed on port A of the DPCM memory 130, and a pixel group from an immediately adjacent row of the X block 70 having the same column locations is addressed on port B of the DPCM memory 130. The pixel groups on ports A and B pass through funnel shifters 140 and 144 without being shifted, and are presented to respectively the A and B ports of the ALU 154. The ALU 154 performs a divide by two and a rounding off, and the result is routed into appropriate address locations of the B block of the DPCM memory 130. This process is continued until the entire vertical interpolation of the X block 70 is complete and the entire B block 74 created.

The C block 76 is formed by progressive interpolation of preferably either the A block 72 vertically, or the B block 74 horizontally. Alternatively, progressive interpolation of the X block diagonally may be done. Horizontal and vertical interpolation are described above in the context of the A block 72 and the B block 74. In diagonal interpolation of the X block 70, one pixel group from the X block 70 is addressed on port A of the DPCM memory 130, and a pixel group from an immediately adjacent row of the X block 70 having the same column locations is addressed on port B of the DPCM memory 130. One of the pixel groups is shifted one pixel; for example, the pixel group in funnel shifter 144 is shifted one pixel, or eight bits, to the right. The unshifted output from funnel shifter 140 and the one-pixel right shifted output from the funnel shifter 144 are presented to respectively the A and B inputs of the ALU 154, which performs a divide by two and a rounding off. The result is routed from the ALU 154 into appropriate address locations of the C block 76 in the DPCM memory 130. This process is continued until the entire horizontal interpolation of the X block 70 is complete and the entire C block 76 created.

Once the search matrix 400 is generated, motion vector searching on a half-pixel basis is similar to motion vector searching on a full-pixel basis, as described in association with expression (1) above. Note, however, that because the X block 70 is 18.times.18 rather than 16.times.16, the interpolated A block 72 is effectively two interpolated 16.times.16 blocks, the interpolated B block 74 is effectively two interpolated 16.times.16 blocks, and the interpolated C block is effectively four interpolated 16.times.16 blocks. The DPCM memory 130 must be carefully addressed to properly read these eight interpolated 16.times.16 blocks. Once all search blocks of the search matrix 400 stored in DPCM memory 130 have been compared with the image block 12 stored in the P block 80 of the DP memory 124, the minimum sum of absolute block differences resides in controller 102, along with the identity of the search block to which it corresponds, known as the best match block.

If no quarter-pixel interpolation is to be done, the motion vector is known simply from the spatial identity of the best match block, while the prediction error is determined as described above in association with expression (2). The calculation is performed in the ALU 154, and the results, the prediction error, are written into the D block 82 of the DP memory 124.

Motion vector searching on a quarter-pixel basis is similar to motion vector searching on a full-pixel basis, except that an absolute block difference is determined from a comparison of the P block 80 with a memory block that contains pixels displaced one-quarter pixel from the best match block. Various interpolation techniques may be used in the derivation of a given quarter pixel estimation block, depending on various factors such as the amount of memory available and the size of the memory ports and data buses. The following technique is suitable for the architecture of FIG. 2, although other techniques may be used if desired.

Generally, the best matched block (which is either a full pixel block or a half pixel interpolated block) is copied from the DPCM memory 130 into a free block of the DP memory 124, which at this point in the process may be the D block 82 or any additional memory block such as 84 (shown in phantom in FIG. 3B) as might be furnished for scratchpad or other purposes. The block of DPCM memory 130 previously containing the best match block is now free to receive the current quarter pixel interpolated block. When interpolation is restricted to only horizontal and vertical interpolation, some of the quarter pixel estimation blocks are interpolated from one or more of the full and half pixel estimation search blocks (X block 70, A block 72, B block 74, and C block 76), while other quarter pixel estimation search blocks are interpolated from quarter pixel estimation search blocks. Alternatively, when diagonal interpolation is also used, all quarter pixel estimation search blocks are interpolated from the full and half pixel estimation search blocks.

The current quarter pixel interpolated block is compared with the image block stored in the P block 80 of the DP memory 124. The comparison yields a current sum of absolute block differences, which is compared with the minimum sum of absolute block differences stored in the controller 102. If the current sum of absolute block differences is less than the minimum sum of absolute block differences, the new value replaces the old value stored in the controller 102, and the identity of the current quarter pixel search block is substituted for the identity of the former best match block stored in controller 102. If the current sum of absolute block differences is equal to or greater than the minimum sum of absolute block differences, no change is made.

At the end of the quarter pixel estimation, the identity of the best match block resides in a register of the controller 102. This may be a full pixel estimation block, a half pixel estimation block, or a quarter pixel estimation block. The motion vector is known simply from the spatial identity of the best match block, while the prediction error between the image block stored as P block 80 in the DP memory 124 and the best match search block stored in the DPCM memory 130 is determined as described above in association with expression (2). The calculation is performed in the ALU 154, and the results, the prediction error, are written into the D block 82 of the DP memory 124.

Figure 5:
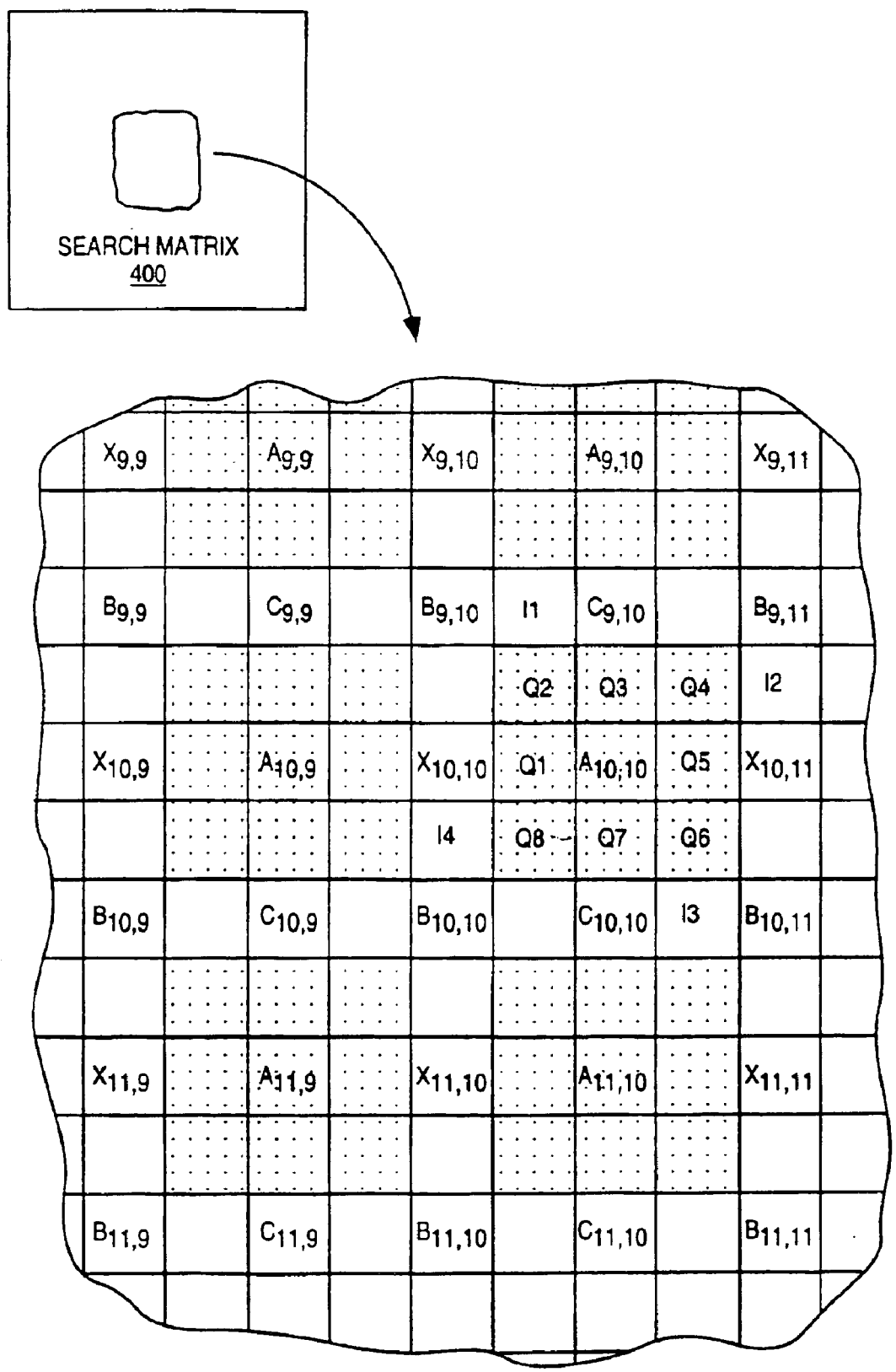

In the limited memory embodiment of FIG. 2, the order in which the quarter pixel estimation search blocks are generated and compared, and the selection of obsolete full and half pixel estimation search blocks to be overwritten are somewhat discretionary. The order shown in FIG. 5 about the pixel element A.sub.10,10 is therefore illustrative. For purposes of illustration, assume that after half pixel estimation, the half pixel interpolated A block 72 is found to be the best match block. FIG. 5 shows in the highlighted areas about the elements A. sub.r,c in the interleaved search matrix 400 (see, for example, the numbered highlighted areas about element A.sub.10,10) that eight blocks must be generated and compared with the image block 12.

First, the best match block is moved from A block 72 of the DPCM memory 130 into the D block 82 of the DP memory 124. In conformance with FIG. 5, however, the pixels of the best match block now stored in the D block 82 are referred to as A.sub.r,c. This frees up the A block 72 to hold the current quarter pixel interpolated block, the pixels of which for convenience are referred to as Q.sub.r,c.

The first quarter pixel estimation search block of Q1 pixels is generated from a horizontal interpolation of the data in the X block 70 and the D block 82, and stored in the A block 72 for the absolute displaced block difference calculation, in accordance with the following expression.

$$Q1.sub.r,c = (X.sub.r,c + A.sub.r,c)/2 \qquad (3)$$

Consider, for example, the interpolation of the Q1 pixel to the left of pixel A.sub.10,10. The pixel group A.sub.10,8–A.sub.10,15 in row ten of the D block 82 is addressed on, say, port A of the DP memory 124 and presented through the multiplexer 152 to the A port of the ALU 154. At about the same time, a collection of pixels containing the pixel group X.sub.10,8–X.sub.10,15 in row ten of the X block 70 is addressed on, say, port A of the DPCM memory 130 and the pixel group X.sub.10,8–X.sub.10,15 is selected by shifter 140 and presented through the multiplexer 152 to the B port of the ALU 154. The ALU 154 sums the pixel groups, divides by two, and rounds the result. An eight pixel result at the output of the ALU 154 is routed back to the DPCM memory 130, where it is stored as pixels Q1.sub.10,8–Q1.sub.10.15 in the tenth row of the A block 72.

The second quarter pixel estimation search block of Q2 pixels is generated from a vertical interpolation of the Q1 pixels with the results of a horizontal interpolation of the data in the B block 74 and the C block 76, with the results being stored in the A block 72 (the Q2 pixels progressively overwriting the Q1 pixels) for the absolute displaced block difference calculation, in accordance with the following expression.

$$Q2.\text{sub.r,c}=(Q1.\text{sub.r,c}+I1.\text{sub.r,c})/2 \tag{4}$$

where $$I1.\text{sub.r,c}=(B.\text{sub.r}-1,c+C.\text{sub.r}-1,c)/2 \tag{5}$$

Consider, for example, the interpolation of the Q2 pixel to the upper left of pixel A.sub.10,10. A collection of pixels containing the pixel group B.sub.9,8–B.sub.9,15 in row nine of the B block 74 is addressed on, say, port A of the DPCM memory 130 and the pixel group B.sub.9,8–B.sub.9,15 is selected by shifter 140 and presented through the multiplexer 152 to the A port of the ALU 154. At about the same time, a collection of pixels containing the pixel group C.sub.9,8–C.sub.9,15 in row nine of the C block 76 is addressed on, say, port B of the DPCM memory 130 and the pixel group C.sub.9,8–C.sub.9,15 is selected by shifter 144 and presented through the multiplexer 152 to the B port of the ALU 154. The ALU 154 sums the pixel groups, divides by two, and rounds the result. An eight pixel result at the output of the ALU 154 is routed to the DP memory 124, where it is stored as pixels I1.sub.9,8–I1.sub.9,15 in the ninth row of I block 84, a free 16.times.16 block of memory in the DP memory 124. Next, the pixel group I1.sub.9,8–I1.sub.9,15 in row nine of the I block 84 is addressed on, say, port A of the DP memory 124 and presented through the multiplexer 152 to the A port of the ALU 154. At about the same time, a collection of pixels containing the pixel group Q1.sub.10,8–Q1.sub.10,15 in row ten of the A block 72 is addressed on, say, port A of the DPCM memory 130 and the pixel group Q1.sub.10,8–Q.sub.10,15 is selected by shifter 140 and presented through the multiplexer 152 to the B port of the ALU 154. The ALU 154 sums the pixel groups, divides by two, and rounds the result. An eight pixel result at the output of the ALU 154 is routed back to the DPCM memory, where it is stored as pixels Q2.sub.10,8–Q.sub.10,15 in the tenth row of the A block 72.

The third quarter pixel estimation search block of Q3 pixels is generated from a vertical interpolation of the data in the C block 76 and the D block 82 (which contains data previously copied from the A block 72), and stored in the A block 72 for the absolute displaced block difference calculation, in accordance with the following expression.

$$Q3.\text{sub.r,c}=(C.\text{sub.r}-1,c+A.\text{sub.r,c})/2 \tag{6}$$

The interpolation of the Q3 pixel above pixel A.sub.10,10 is done essentially as described above with respect to the Q1 pixel, but in accordance with expression (6).

The fourth quarter pixel estimation search block of Q4 pixels is generated from a horizontal interpolation of the Q3 pixels with the results of a vertical interpolation of the data in the B block 74 and the X block 70, with the results being stored in the A block 72 (the Q4 pixels progressively overwriting the Q3 pixels) for the absolute displaced block difference calculation, in accordance with the following expression.

$$Q4.\text{sub.r,c}=(Q3.\text{sub.r,c}+I2.\text{sub.r,c})/2 \tag{7}$$

where $$I2.\text{sub.r,c}=(B.\text{sub.r}-1,c+1+X.\text{sub.r,c}+1)/2 \tag{8}$$

The interpolation of the Q4 pixel to the upper right of the pixel A.sub.10,10 is done essentially as described above with respect to the Q2 pixel, but in accordance with expression (7).

The fifth quarter pixel estimation search block of Q5 pixels is generated from a horizontal interpolation of the data in the X block 70 and the D block 82, and stored in the A block 72 for the absolute displaced block difference calculation, in accordance with the following expression.

$$Q5.\text{sub.r,c}=(X.\text{sub.r,c}+1+A.\text{sub.r,c})/2 \tag{9}$$

The interpolation of the Q5 pixel to the right of the pixel A.sub.10,10 is done essentially as described above with respect to the Q1 pixel, but in accordance with expression (9).

The sixth quarter pixel estimation search block of Q6 pixels is generated from a vertical interpolation of the Q5 pixels with the results of a horizontal interpolation of the data in the B block 74 and the C block 76, with the results being stored in the A block 72 (the Q6 pixels progressively overwriting the Q5 pixels) for the absolute displaced block difference calculation, in accordance with the following expression.

$$Q6.\text{sub.r,c}=(Q5.\text{sub.r,c}+I3.\text{sub.r,c})/2 \tag{10}$$

where $$I1.\text{sub.r,c}=(B.\text{sub.r,c}+1+C.\text{sub.r,c})/2 \tag{11}$$

The interpolation of the Q6 pixel to the lower right of the pixel A.sub.10,10 is done essentially as described above with respect to the Q2 pixel, but in accordance with expression (10).

The seventh quarter pixel estimation search block of Q7 pixels is generated from a vertical interpolation of the data in the C block 76 and the D block 82, and stored in the A block 72 for the absolute displaced block difference calculation, in accordance with the following expression.

$$Q7.\text{sub.r,c}=(C.\text{sub.r,c}+A.\text{sub.r,c})/2 \tag{12}$$

The interpolation of the Q7 pixel below pixel A.sub.10,10 is done essentially as described above with respect to the Q1 pixel, but in accordance with expression (12).

The eighth quarter pixel estimation search block of Q8 pixels is generated from a horizontal interpolation of the Q7 pixels with the results of a vertical interpolation of the data in the B block 74 and the X block 70, with the results being stored in the A block 72 (the Q8 pixels progressively overwriting the Q7 pixels) for the absolute displaced block difference calculation, in accordance with the following expression.

$$Q8.\text{sub.r,c}=(Q7.\text{sub.r,c}+I4.\text{sub.r,c})/2 \tag{13}$$

where $$I1.\text{sub.r,c}=(B.\text{sub.r,c}+X.\text{sub.r,c})/2 \tag{14}$$

The interpolation of the Q8 pixel to the lower left of the pixel A.sub.10,10 is done essentially as described above with respect to the Q2 pixel, but in accordance with expression (13).

It will be appreciated that a great many permutations of the order of derivation of pixels Q1–Q8 may be practiced, if desired. For example, the Q2 pixels may be derived from a horizontal interpolation of the Q3 pixels with the results of a vertical interpolation of the data in the B block 74 and the X block 70. As a further example, the Q2 pixels may be derived from a diagonal interpolation of the data in the A block 72 and the B block 74.

It will also be appreciated that a variety of search techniques may be used to search through the search window 24. For example, in the full search described above, the image block 12 is compared with every search block in the search window 24. Given a search block of 16.times.16 pixels and a search window of 31.times.31 pixels, 256 comparisons are required. The "jump" search is a faster although less accurate type of search, in which some of the search blocks are regularly jumped over so that the image block 12 is compared with only a subset of all search blocks in the search window 24. For example, in a two pixel interval jump search, the image block 12 is compared with every other search block in the search window 24, requiring 64 comparisons (counting partial search blocks). A binary search is a faster search yet. In the initial step of the binary search, a search is conducted with a binary jump size equal to a division of the block size. In the next step, the best match block from the first phase search becomes the center of a new smaller search area, and this new smaller search area is searched with a smaller binary jump size. This last process step is repeated until a full search (binary jump size 1) is completed. For example, given a search block size of 16.times.16 pixels and a first jump size of 4 pixels, the initial step of the binary search of the 31.times.31 search window 24 requires 16 comparisons. A best match block is identified, a new smaller jump interval of two pixels is selected, a new smaller search area centered on the best match block and extending to all pixels surrounding the best match block to a distance of the old jump interval halved, or 2 pixels (to exclude the nearest blocks compared in the previous search) is defined (size 20.times.20), and the new window is searched, requiring 8 comparisons. A new best match block is identified, a final smaller jump interval of one pixel is selected, a new smaller search area centered on the best match block and extending to all pixels surrounding the best match block to a distance of the old jump interval halved, or 1 pixel (to exclude the nearest blocks compared in the previous search) is defined (size 18.times.18), and the new window is searched, requiring 8 comparisons. The total number of comparisons in the binary search is 16+8+8, or 32 comparisons.

While the architecture 100 of FIG. 2 is suitable for a variety of vision processing applications, an implementation particularly suitable for a programmable vision processor such as disclosed in the above-referenced patent document of Fandrianto et al. entitled "Vision Processor" is now described.

In the motion vector searching architecture 100 of FIG. 2, a reduced instruction set controller 102 executes instructions for serial operations, and runs in parallel with the data path of the architecture 100. Controller 102 is any simple, general purpose controller of conventional design capable of executing simple arithmetic and logic operations. Controller 102 is operated by microcode, but may be software controlled if desired. If desired, a more powerful processor or a less flexible state machine may be used in place of controller 102. An input/output ("I/O") state machine 104 capable of transferring data between system memory (typically external page-mode DRAMs; not shown) and the controller 102 and memories 124 and 130 of the motion vector search architecture 100 is provided so that DMA (direct memory access) data transfers can be overlapped with compression operations. Various control signals for starting and terminating DMA transfers are received through port CONTROL and applied to the I/O state machine 104, which distributes related control signals throughout the architecture 100. The I/O state machine 104 supports burst mode transfers with system memory (not shown) over data bus ("DBUS") [31:0]. Command queue 106 is a set of registers which receive and store command data received through command bus ("CBUS") [15:0] from a host controller. Instructions for the I/O state machine 104 are furnished over bus 108 by command queue 106, which also provides command data to a program counter and sequencer ("PCS") 110. PCS 110 is responsive to an output enable address ("OEA") signal for incrementing an address stored therein and furnishing the address over an address bus ("ADBUS") to a program and microcode memory (not shown). A decoder 112 receives program and microcode information on an instruction bus ("IBUS") [31:0] from the program and microcode memory (not shown). These various elements of the control system and the manner in which they control data path operations are disclosed in further detail in the aforementioned patent document of Fandrianto et al. entitled "Vision Processor," and are hereby incorporated herein by reference thereto.

Figure 6:
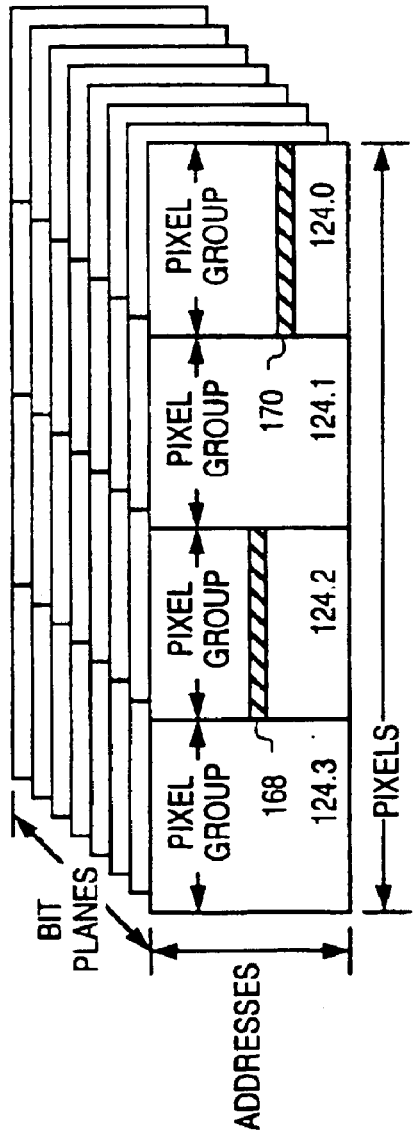
FIGS. 6 and 7 are schematic representations of the configuration of various memories in the architecture of FIG. 2.

In a vision processor embodiment, the DP memory 124 is used generally to store current (or preframe), matched, and other temporarily needed blocks, and hence functions to store image blocks for motion estimation, intermediate blocks for interpolation, and the prediction error and image blocks for DCT computations in motion-compensated based digital image processing. For these purposes, the DP memory 124 is most conveniently conceptualized as a single memory of 128 addressable locations, each 8 pixels wide. The DP memory 124 is implemented for layout purposes as a set of four individually addressable A.times.B (address.times.pixel) banks of pixels 124.0–124.3, as illustrated in FIG. 6. Each of the banks 124.0–124.3 is configured as a collection of 32 addressable groups of 8 pixels per group, which is equivalent to a 16.times.16 pixel macroblock size. As each pixel consists of 8 bits, the DP memory 124 has eight bit planes, as shown in FIG. 6.

It will be appreciated, however, that only half of the DP memory 124 as configured for vision processing is required for motion vector searching. The D block 82 and the P block 80 are each stored in 32 addressable groups of the DP memory 124, the remaining 64 addressable groups of memory being equivalent to two blocks of memory that are available for temporary block storage during motion estimation, to implement other motion estimation algorithms requiring additional memory, and for purposes unrelated to motion vector estimation.

The output from each of the ports A and B of the DP memory 124 is 8 pixels. For example, pixel group 168 of bank 124.2 may be addressed and read on port A, while pixel group 170 of bank 124.0 may be addressed and read on port B. The ports A and B of the DP memory 124 are capable of being read essentially simultaneously.

Figure 7:
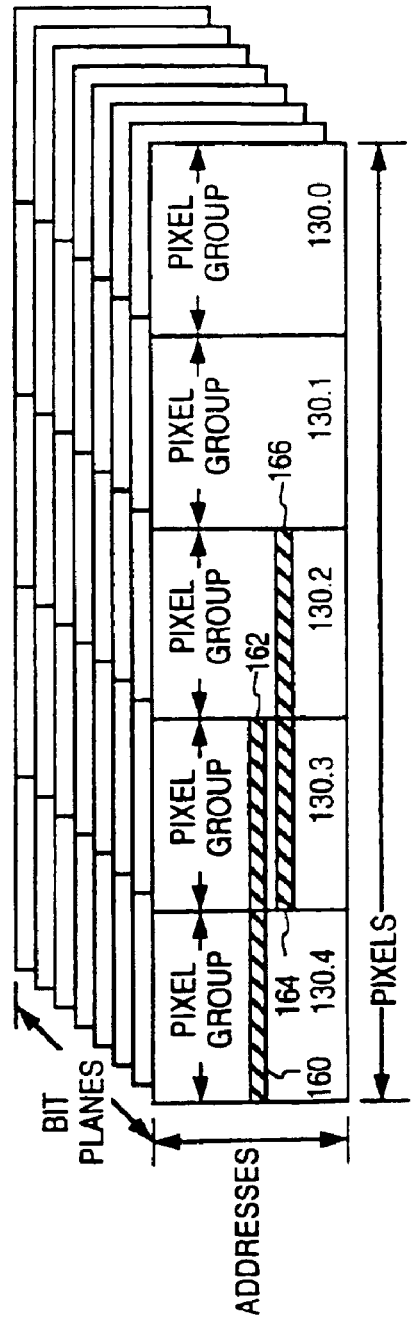

In a vision processor embodiment, the DPCM memory 130 is used generally to store the search window 24, whether copied from frame memory 20 or interpolated from a best match block. For this purpose, the DPCM memory 130 is most conveniently conceptualized as a set of five M.times.N (address.times.pixel) banks of pixels 130.0–130.4, as illustrated in FIG. 7. Each of the banks 130.4–130.0 is configured as a collection of 36 addressable groups of 8 pixels each. As each pixel consists of 8 bits, the DPCM memory 130 has eight bit planes, as shown in FIG. 7. In integral pixel estimation, the size of the search window 24 is 31.times.31 pixels, requiring only four banks per row. In half-pixel estimation, the X block 70 uses 18 contiguous pixels per row, the A block 72 uses 17 contiguous pixels per row, the B block 74 uses 18 contiguous pixels per row, and the C block 76 uses 17 contiguous pixels per row.

A useful feature of the DPCM memory 130, particularly in conjunction with the shifters 140 and 144, is that when any one group of pixels in a bank of the DPCM memory 130 is accessed and read on one of the ports A or B of the DPCM memory 130, the adjacent group of pixels from an adjacent bank is automatically accessed and read on the same port. For example, if pixel group 160 of bank 130.4 is addressed and read on port A, pixel group 162 of bank 130.3 is also read on port A. If pixel group 164 of bank 130.3 is addressed and read on port B, pixel group 166 of bank 130.2 is also read on port B. Hence, the output from each of the ports A and B of the DPCM memory 130 is 16 pixels, 8 pixels from the selected group and 8 pixels from the adjacent group. The ports A and B of the DPCM memory 130 are capable of being read essentially simultaneously.

Memories 124 and 130 are addressed in parallel by an address generator 120 with auto-increment capability. The address bus to DP memory 124 carries 2 addresses, and the address bus to DPCM memory 130 carries 2 addresses. The address generator 120 is responsive to address data from the I/O state machine 104, and to instruction information from the decoder 112.

Fast motion estimation is facilitated by the two funnel shifters 140 and 144. Shifter 140 receives the 16 pixel output from port A of the DPCM memory 130, and shifter 144 receives the 16 pixel output from port B of the DPCM memory 130.

The DPCM memory 130 and the shifters 140 and 144 act in conjunction to provide a particularly advantageous type of memory, a pixel-group random access memory ("PRAM") element 131. Memory element 131 has 36 addressable locations of 40 pixels each, and provides on each output port any eight contiguous pixels from any of the addressable locations. Generally, if N is the number of pixels furnished on an output port, the memory element 131 has a number of addressable locations of a size greater than N, and is able to select any N contiguous pixels from any of the addressable locations for output on the output port. This feature is particularly advantageous in full pixel motion estimation because the 256 possible full pixel search blocks are scattered in the DPCM memory 130, and is also advantageous in half- and quarter-pixel interpolation in which the sizes of the principal blocks such as, for example, the X block 70, the A block 72, the B block 74, and the C block 76, are not constrained to a uniform 16.times.16 pixel size.

The flexibility afforded by PRAM addressing of the PRAM memory 130 makes possible minimizing I/O DMA transfers as new search windows are loaded into the DPCM memory 130. In the architecture 100, often only a part of the search window confined to two banks of the DPCM memory 130 is obsolete. In such cases, a new search window is created merely by overwriting with new pixel data the two banks of the DPCM memory 130 containing the obsolete pixel data. Note, however, that a search window assembled in this way does not have a static structure in the DPCM memory 130. PRAM addressing of the DPCM memory 130 under program control provides the flexibility required to make effective use of the dynamically varying search window structure in the DPCM memory 130.

Pixel and word arithmetic processing is provided by the ALU 154, which receives pixel data items from shifters 140 and 144 through multiplexer 154. The ALU 154 is used for absolute difference operations and half-pixel interpolations of the motion estimation. Receiving operandi A and B, the ALU 154 on one output denoted ".vertline.A−B.vertline." the absolute value of A−B, and on the other output denoted "X" a value depending on the mode of operation: the value A+B in sum mode, the value A−B in difference mode, and the value (A+B)/2 in averaging mode.

For half-pixel interpolations and some quarter pixel interpolations, the multiplexer 152 is placed in ONE mode to select 8 pixels from, for example, the A port of the DPCM memory 130 through the shifter 140 as one-half the B operand (the least significant pixels, for example), and 8 pixels from, for example, the B port of the DPCM memory 130 through the shifter 144 as one-half of the A operand (the least significant pixels, for example). The most significant pixels of the operandi A and B are "don't care." The ALU 154 is placed in averaging mode, and the eight least significant pixels at the X output of the ALU 154 representing (A+B)/2 are written into appropriate addressable locations of DPCM memory 130 through multiplexer 128. The eight most significant pixels are not used.

For some quarter pixel interpolations using an intermediate interpolation and the prediction error calculation using the P block 80, the multiplexer 152 is placed in ZERO mode to select 16 pixels from, for example, the B port of the DP memory 124 as one-half the B operand (8 pixels are "don't care"), and 16 pixels from, for example, the B port of the DPCM memory 130 as one-half of the A operand (8 pixels are "don't care"). The ALU 154 is placed in difference mode, and the eight least significant pixels of the X output representing the quantity A−B are written into appropriate addressable locations of DPCM memory 130 through multiplexer 128 for quarter pixel interpolation, and into appropriate addressable locations of the DP memory 124 through multiplexer 122 for the prediction error. The eight most significant pixels are not used.

For determining a sum of absolute differences, the 16 pixel absolute difference output .vertline.A−B.vertline. is applied to tree adder 156. The result is furnished to controller 102, which uses the result to determine which of a plurality of motion vectors is minimum.

The inputs of the memories 124 and 130 are selectable. DP memory 124 receives two or eight pixel data items at each write enable, depending on the state of multiplexer 122. DPCM memory 130 receives two or eight pixel data items at each write enable, depending on the state of multiplexer 128.

Direct outputs to the I/O state machine 104 and the controller 102 are provided for from the DP memory 124 and the ALU 154. Multiplexer 126 selects two pixels from either the 8 pixel output from port B of the DP memory 124 or the 8 least significant pixels of the output of the ALU 154 for input to the controller 102 and the I/O state machine 104 over the bus 103, since the bus 103 is only two pixels wide as shown in FIG. 2.

Addressing

Figure 8:
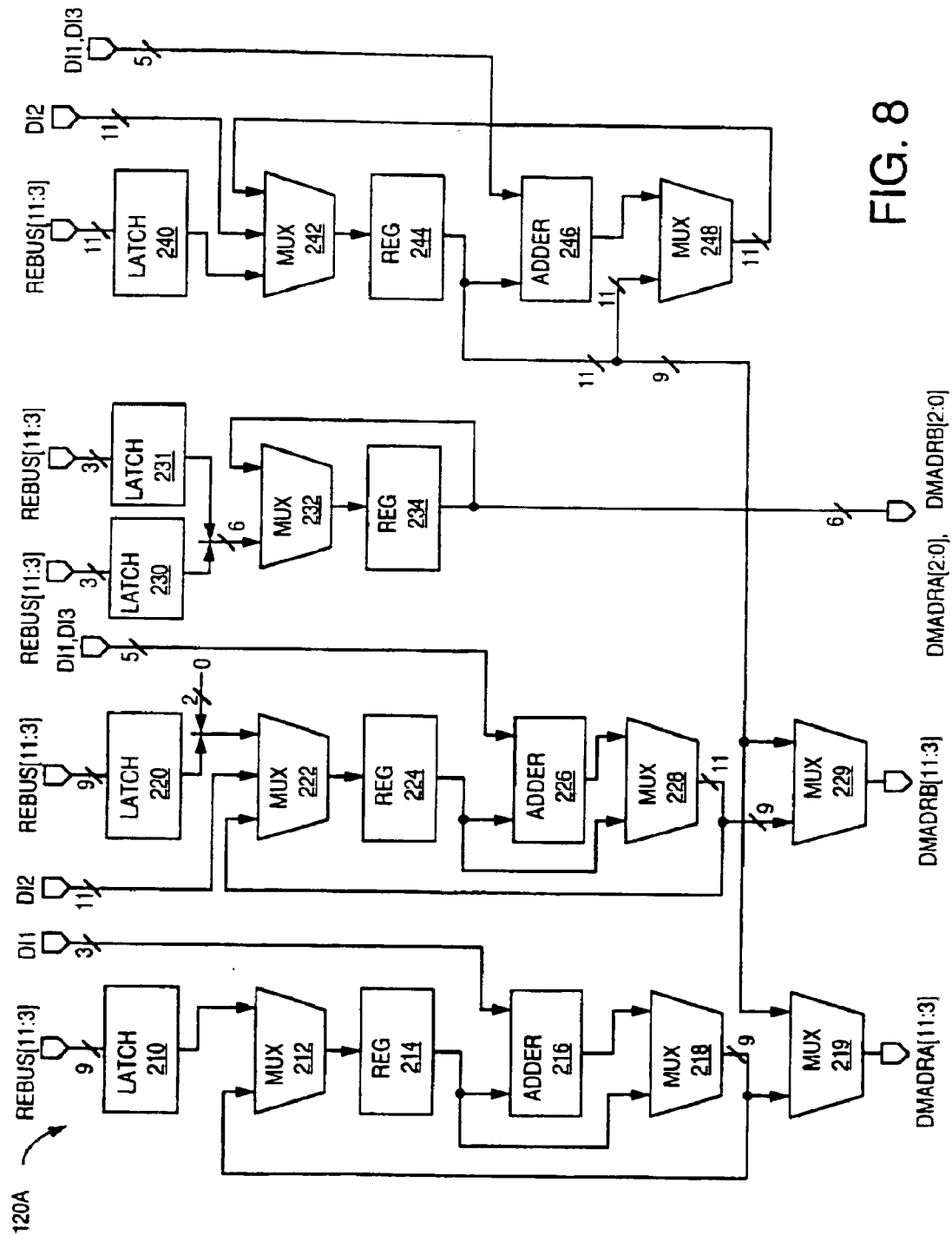
FIG. 8 is a block diagram of an address generator.

The address generator 120, illustrated in greater detail in FIG. 8, generates addresses for the DP memory 124 and the DPCM memory 130. The various functional elements of the address generator 120 are controlled by microcode through the decoder.

The DPCM memory is a three ported memory having read ports A and B and write port W. These ports have corresponding preloadable registers 214, 224, and 244 in the section 120a of the address generator 120 shown in FIG. 8, which are writable by the controller 102 over lines REBUS [11:3] (reduced instruction set controller engine bus) of bus 105. Specifically, register 214 is loaded by latching REBUS [11:3] with latch 210 when multiplexer 212 is set to select the output of the latch 210. Similarly, register 224 is loaded by latching REBUS [11:3] with latch 220 when multiplexer 222 is set to select the output of the latch 210; and register 244 is loaded by latching REBUS [11:3] with latch 240 when multiplexer 242 is set to select the output of the latch 240. Alternatively, in autoincrement mode, registers 214, 224 and 244 are loaded through multiplexers 212, 222 and 242 respectively, from the outputs of multiplexers 218, 228 and 248 respectively. Alternatively, registers 224 and 244 are loaded through multiplexers 222 and 242 respectively, with the data item DI2 being supplied by external command on CBUS. Note that the path through register 214 is a 9-bit path, while the paths through registers 224 and 244 are 11-bit paths.

Adders 216, 226 and 246 increment the contents of, respectively, registers 214, 224 and 244 with the data item DI1. Data item DI1 is a 3-bit value controlled by the mode register bits [1:0] in the 16 bit microcode supplied to the decoder 112, as follows: bit [2] is true when MODE[1].times.MODE[0] is true, and otherwise false; bit [1] is true when MODE[1] is true, and otherwise false; and bit [0] is true when MODE[1]+MODE[0] is true, and otherwise false. In certain datapath operations such as interpolations, the three port addresses are incremented simultaneously by the same increment amount. Since adders 226 and 246 are in an 11-bit path, the 3-bit data item DI1 is supplemented with logical ONES at the two least significant bit positions. Moreover, adders 226 and 246 controllably increment the outputs of, respectively, registers 224 and 244 with the 5-bit data item DI3. With multiplexer 219 set to select the output of multiplexer 218, the read address DMADRA [11:3] is either the value of the register 214 or the incremented value of register 214, depending on the state of multiplexer 218. With multiplexer 229 set to select the output of multiplexer 228, the read address DMADRB [11:3] is either the value of the register 224 or the incremented value of register 224, depending on the state of multiplexer 228. The nine most significant bits of the output of multiplexer 228 are routed to the input of multiplexer 229. With multiplexers 219 and 229 set to select the output of multiplexer 248, write addresses DMADRA [11:3] and DMADRB [11:3] are the value of the nine most significant bits of the register 244.

The six bit output of register 234 is furnished to the shifters 140 and 144 as DMADRA [2:0] and DMADRB [2:0] for PRAM addressing. Register 234 is selectively loaded with the value of REBUS [2:0] latched by latches 230 and 231, or with its current value, depending on the state of multiplexer 232.

Hence, it will be appreciated that the full address DMADRA [11:0] and DMADRB [11:0] is applied to the memory element 131 for PRAM addressing.

The DP memory 124 is also a three ported memory having read ports A and B and write port W. The section (not shown) of the address generator 120 provided to address DP memory 124 is similar to the section 120a, except for a few notable differences. The path through the register corresponding to register 214 is seven bits rather than 9 bits, and is loaded through REBUS [6:0]. The paths through the registers corresponding to registers 224 and 244 are nine bits rather than eleven bits, and are loaded through REBUS [6:0]. Data item DI1 differs from data item DI1 of the section 120a in that its 3 bits are controlled by the mode register bits [3:2] in the 16 bit microcode supplied to the decoder 112, as follows: bit [2] is true when MODE[3].times.MODE[2] is true, and otherwise false; bit [1] is true when MODE[3] is true, and otherwise false; and bit [0] is true when MODE [3]+MODE[2] is true, and otherwise false. Data item DI3 is generally the same as data item DI3 of the section 120A. Data item DI2 is generally the same, except that it is nine rather that eleven bits. The outputs to DP memory 124 are DPADRA [6:0] and DPADRB [6:0].

Datapath Elements

Figure 9:
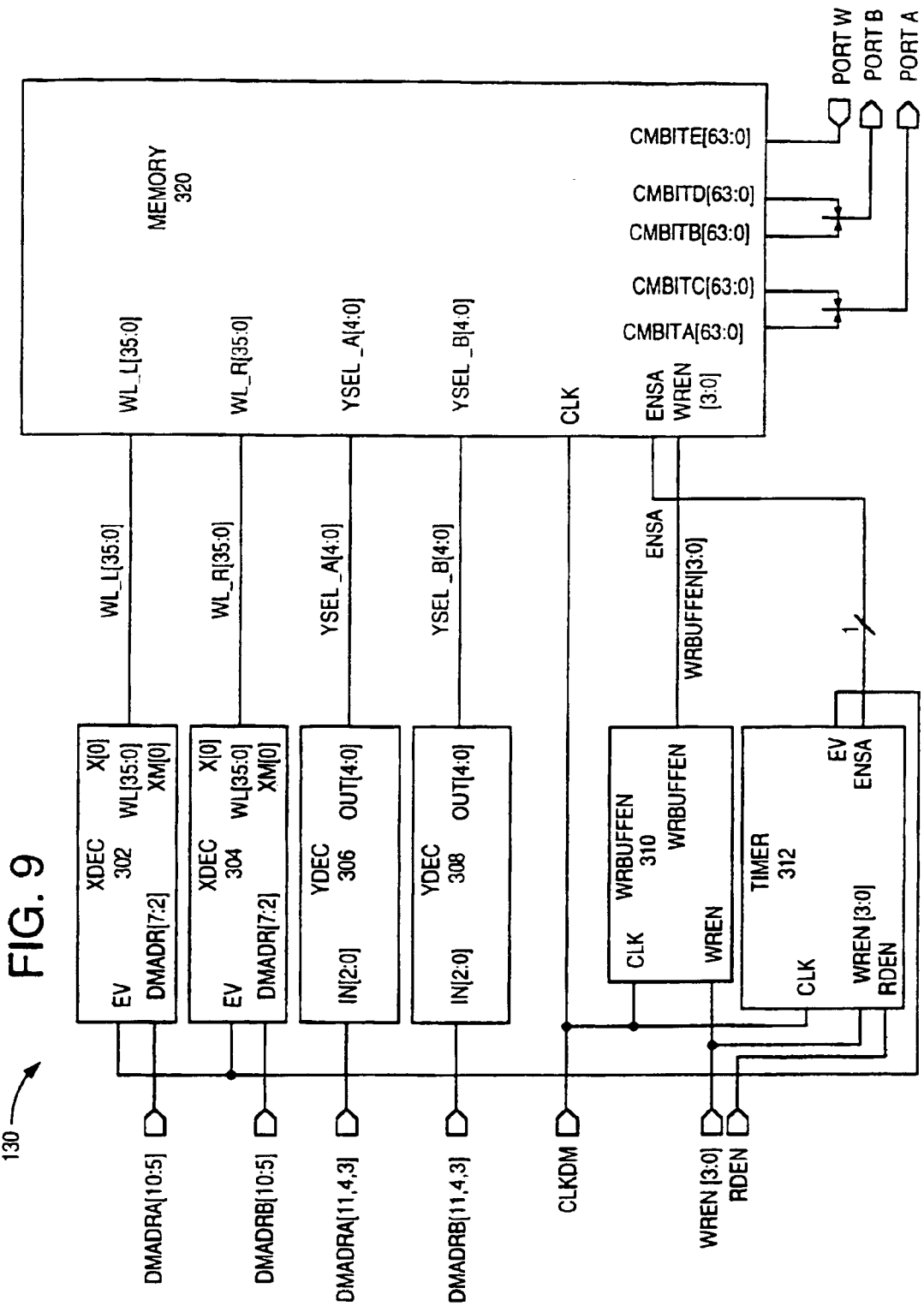
FIG. 9 is a block schematic diagram of a pixel-group random access memory useful in the datapath of the architecture of FIG. 2.
Figure 10A:
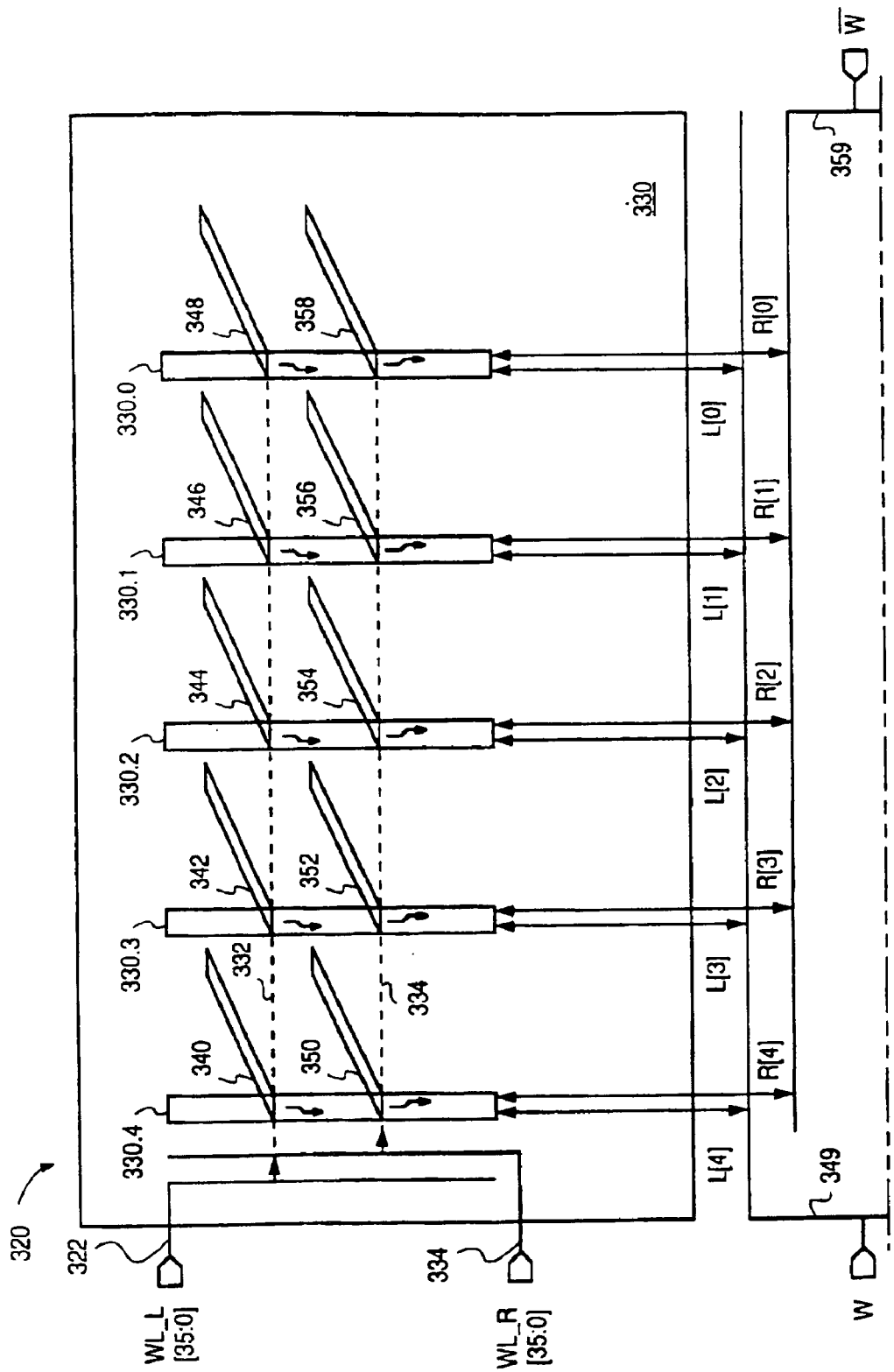
FIGS. 10A and 10B are a schematic representation of a portion of the pixel-group random access memory of FIG. 9.

An illustrative DPCM memory 130 is shown in FIG. 9 and FIG. 10. DPCM memory 130 is configured with five banks 130.4–130.0 (FIG. 7) of, for example, 36.times.64 bit conventional SRAM memory designed to support two reads from different array addresses within the same cycle. Writes are supported through write port W (and its complement W-bar) when the port A and port B addresses are equal. The schematic illustration of FIG. 10 shows a one bit slice 320 of the DPCM memory 130. The sixty-third bit columns of the five banks 130.4–130.0 are represented by bit columns 330.4–330.0, respectively. Word line 332, which is associated with the left or "A" port of the memory 130, is asserted by the X decoder 302 for port A to read five 64-bit pixel groups 340, 342, 344, 346 and 348 onto the bus 349. In FIG. 10, which shows only a single slice, bit [63] of each of the pixel groups 340, 342, 344, 346 and 348 are placed on the bus 349 as bits L[4], L[3], L[2], L[1] and L[0]. Similarly, word line 334, which is associated with the right or "B" port of the banks 330.4–330.0, is asserted by the X decoder 304 for port B to read five 64-bit pixel groups 350, 352, 354, 356 and 358 onto the bus 359. In FIG. 10, which shows only a single slice, bit [63] of each of the pixel groups 350, 352, 354, 356 and 358 are placed on the bus 359 as bits R[4], R[3], R[2], R[1] and R[0].

Figure 10B:
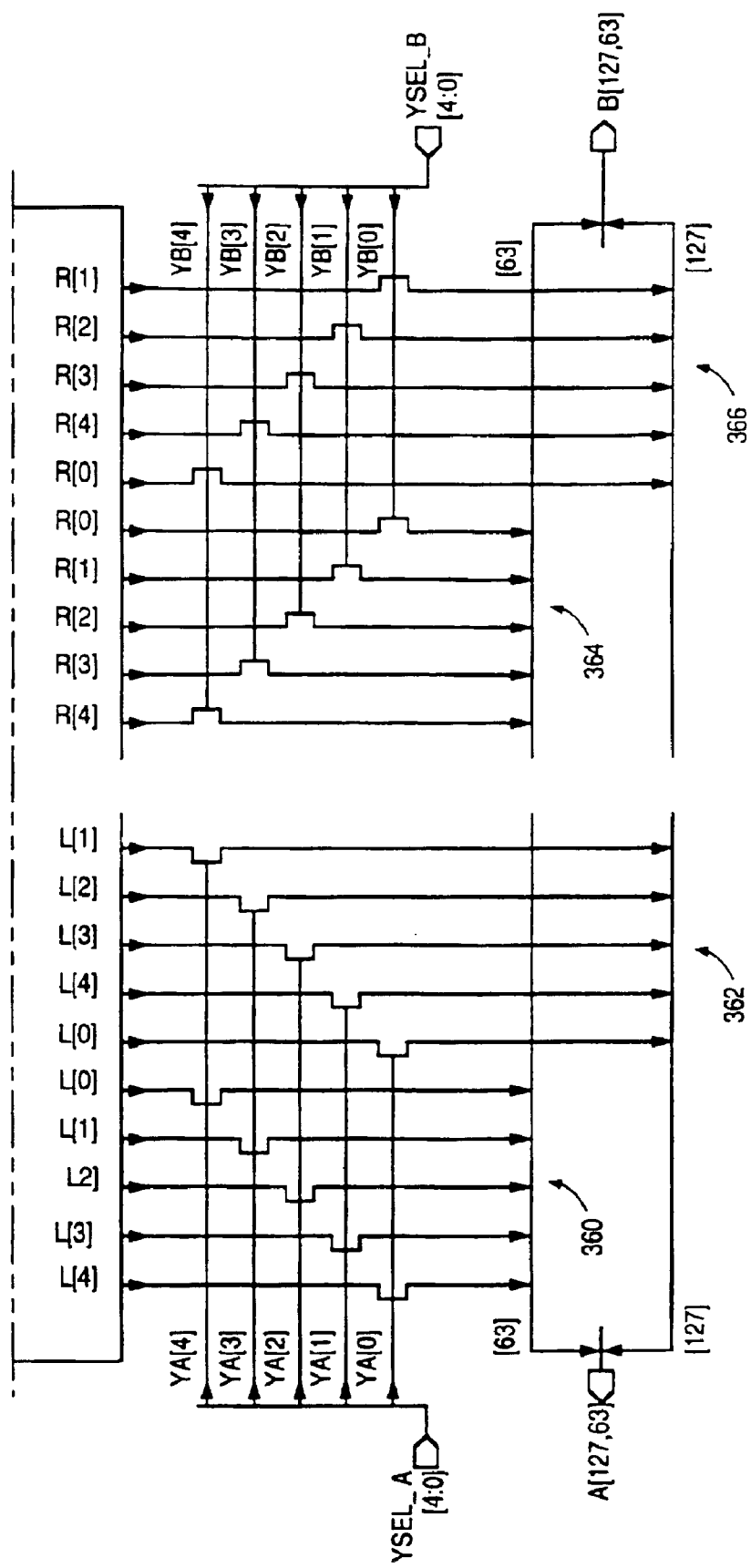
Figure 11A:
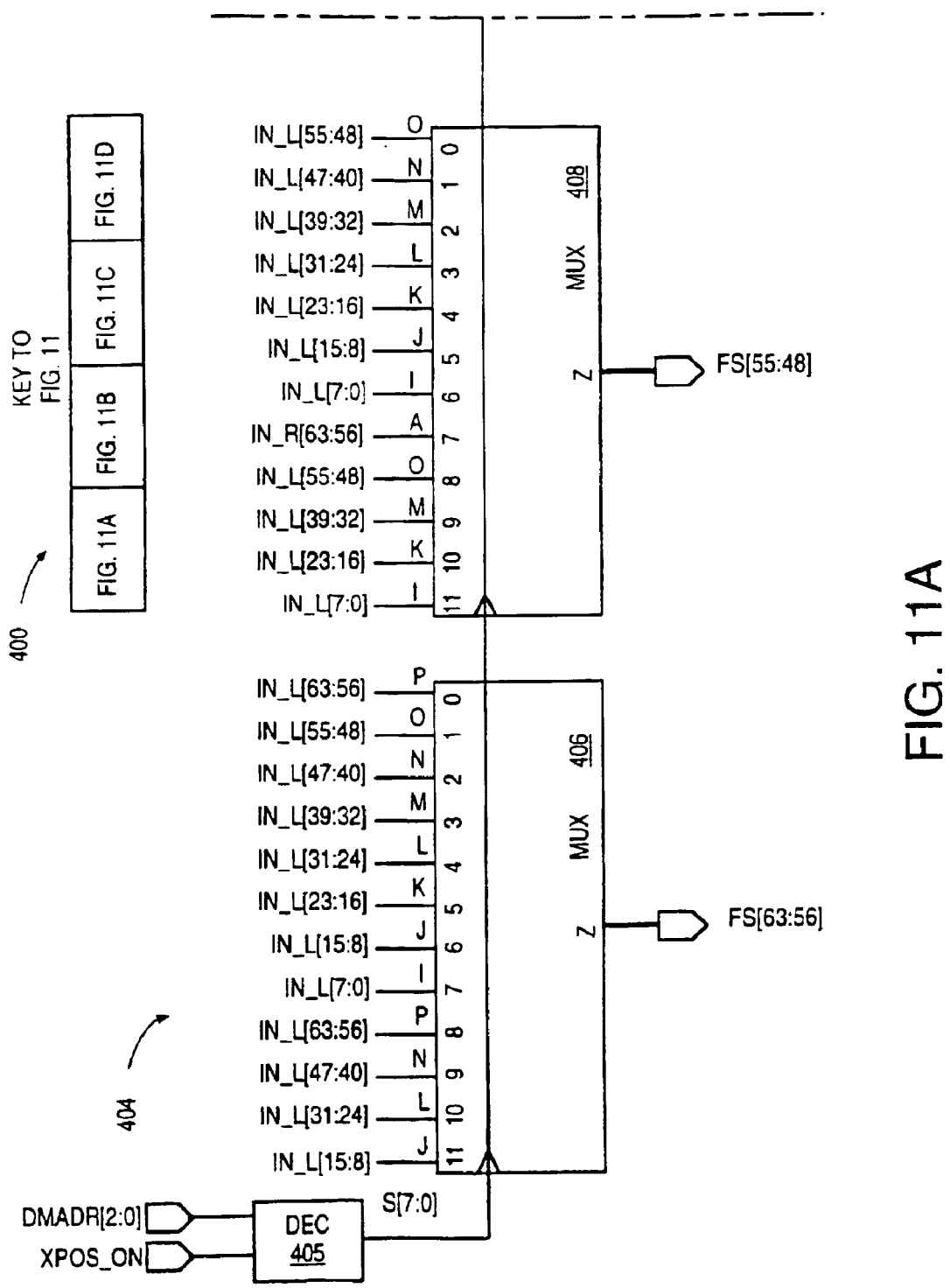
FIGS. 11A–11D are a block schematic diagram of a funnel shifter and transpose network useful in the datapath of the architecture of FIG. 2.
Figure 11B:
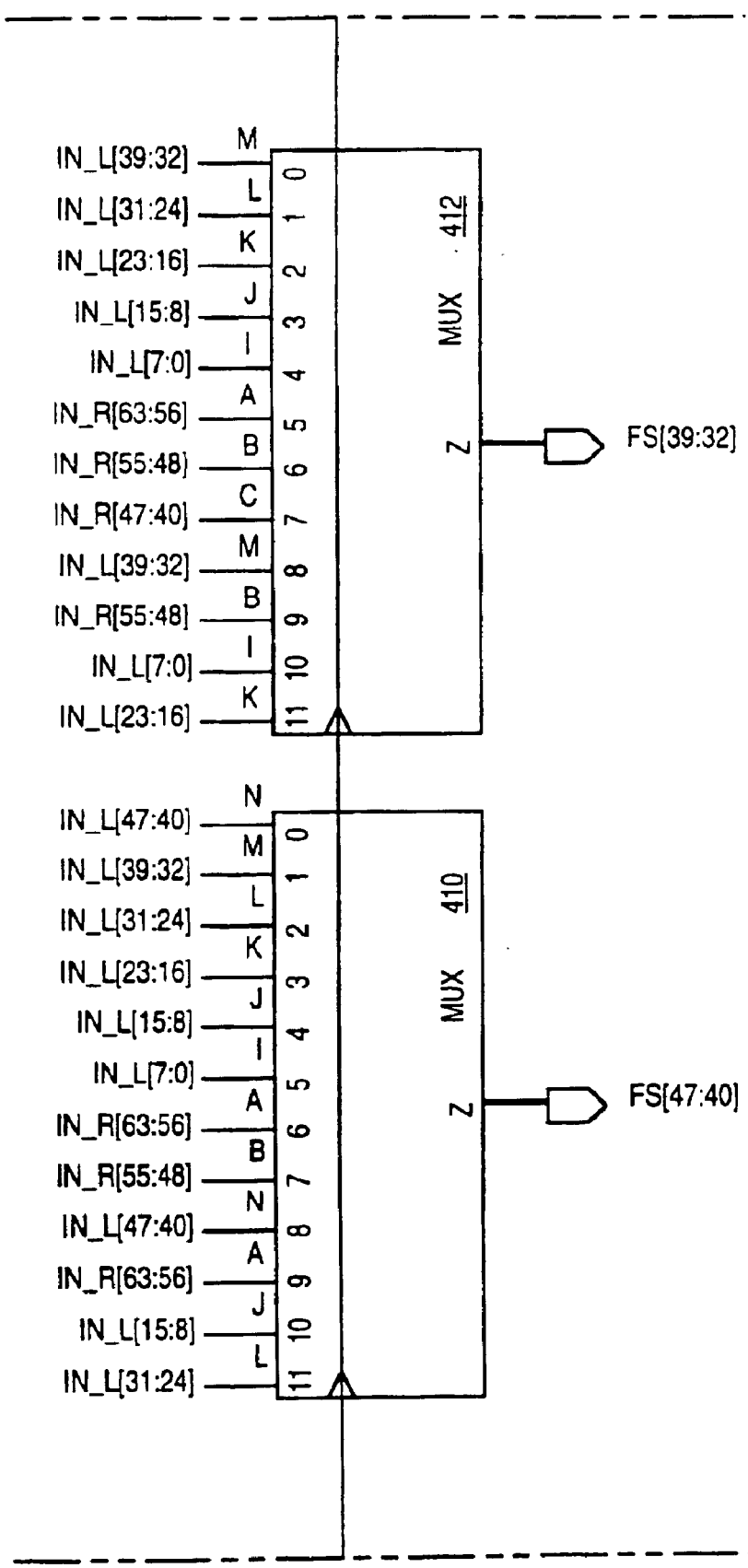
Figure 11C:
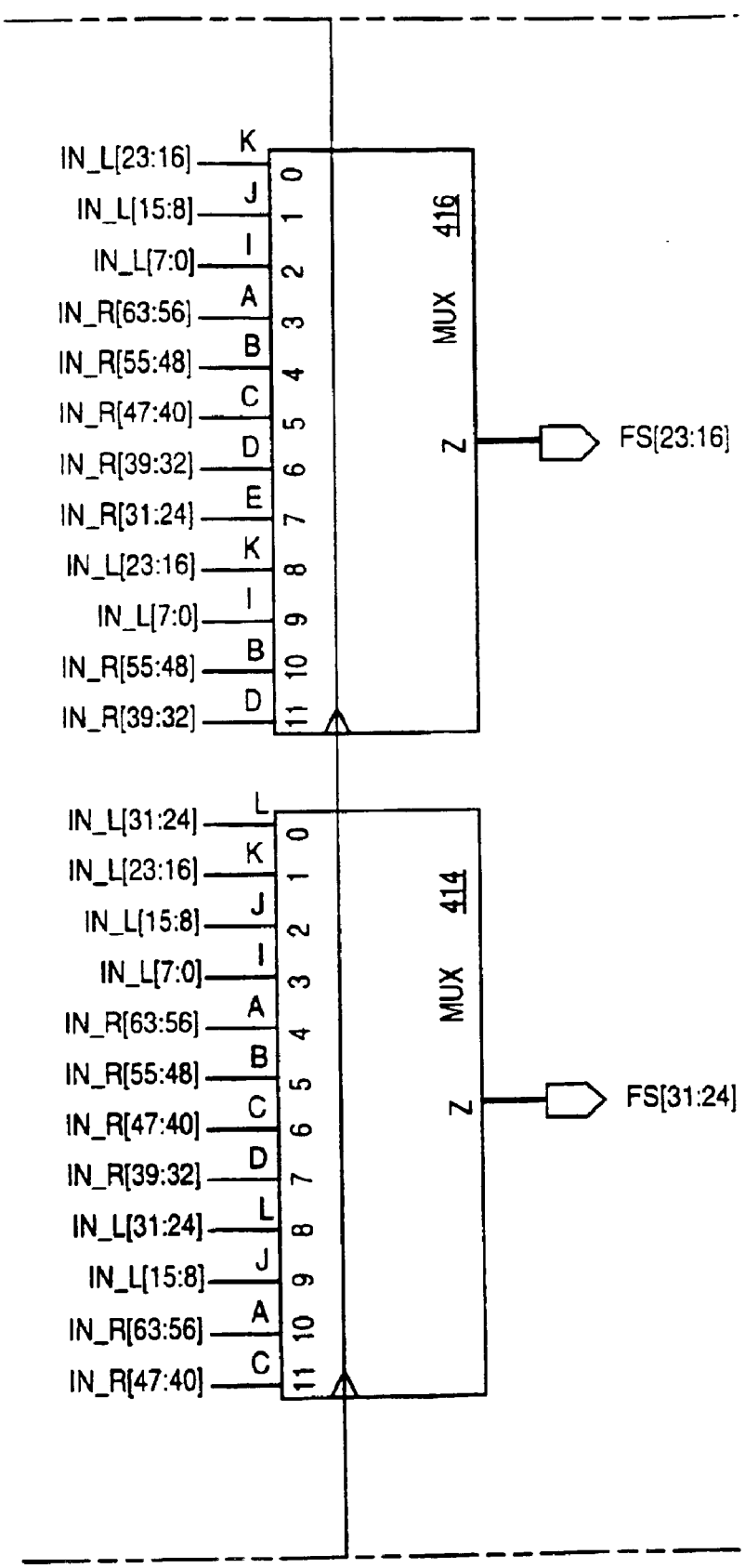
Figure 11D:
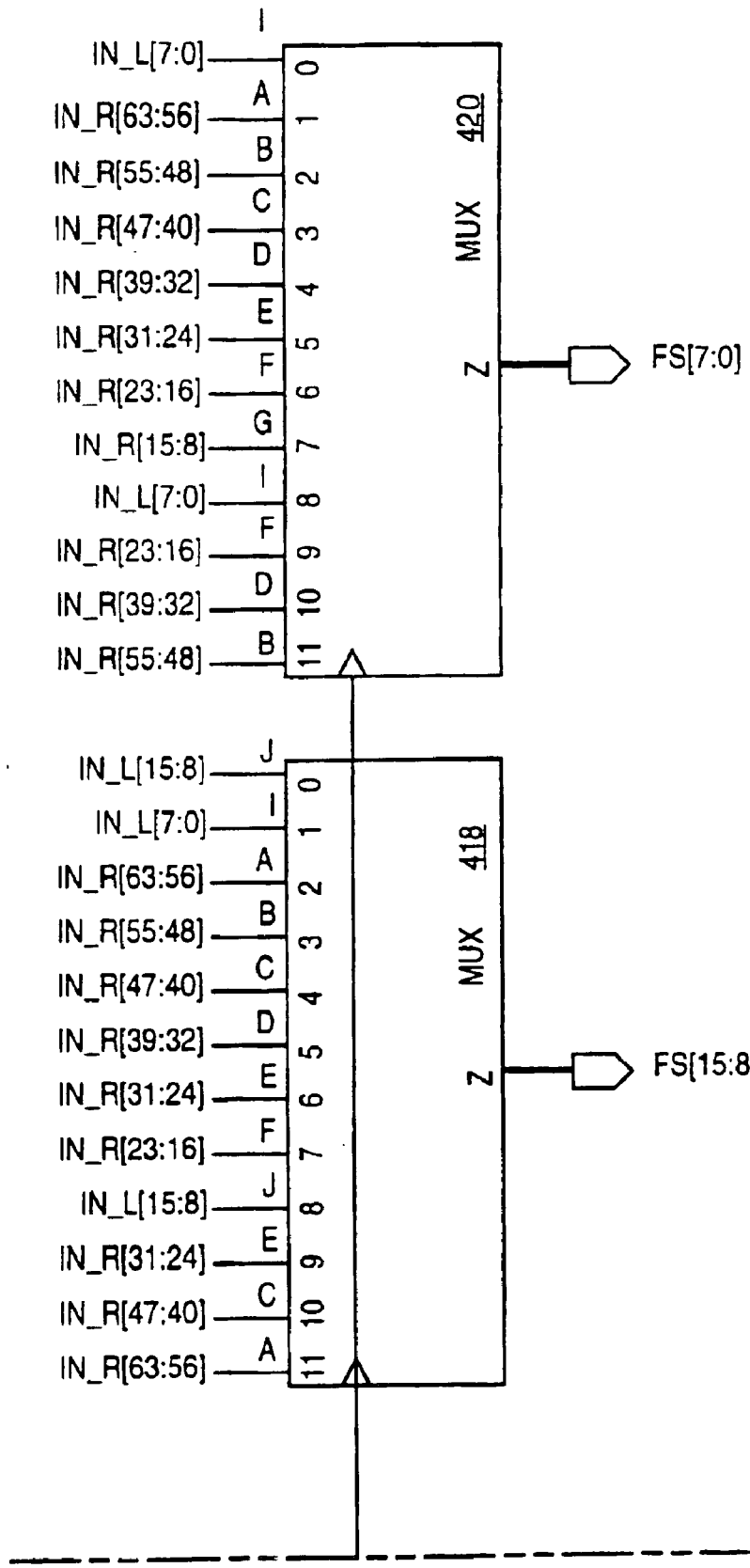

BUS 349 routes the selected left side pixel groups to two 5:1 multiplexers indicated generally at 360 and 362 in FIG. 10B, both of which are driven by the Y select decoder 306 for port A. Multiplexers 360 and 362 include five MOSFET transistors, with their gates respectively driven by YSEL.sub.—A[4:0], their drains connected to the appropriate bit lines of bus 349, and their sources connected to the appropriate bit lines of port A. Multiplexer 360 selects the current pixel group addressed by X decoder 302 and Y decoder 306, as bits L[4], L[3], L[2], L[1] and L[0] are connected respectively to port 4, 3, 2, 1 and 0. At the same time, multiplexer 362 selects the adjacent pixel group from the next bank to the left, as bits L[0], L[4], L[3], L[2] and L[1] are connected respectively to ports 4, 3, 2, 1 and 0. Bit [63] of the pixel group selected by multiplexer 360 is placed on bit line [63] of the port A bus, while bit [63] of the adjacent pixel group selected by multiplexer 362 is placed on bit line [127] of the port A bus.

Similarly, bus 359 routes the selected right side pixel groups to two 5:1 multiplexers indicated generally at 364 and 366 of FIG. 10B, both of which are driven by the Y select decoder 308 for port B. Multiplexers 364 and 366 include five MOSFET transistors, with their gates respectively driven by YSEL.sub.—B[4:0], their sources connected to the appropriate bit lines of bus 359, and their drains connected to the appropriate bit lines of port B. Multiplexer 364 selects the current pixel group addressed by X decoder 304 and Y decoder 308, as bits R[4], R[3], R[2], R[1] and R[0] are connected respectively to ports 4, 3, 2, 1 and 0. At the same time, multiplexer 366 selects the adjacent pixel group from the next bank to the left, as bits R[0], R[4], R[3], R[2] and R[1] are connected respectively to ports 4, 3, 2, 1 and 0. Bit [63] of the pixel group selected by multiplexer 364 is placed on bit line [63] of the port B bus, while bit [63] of the adjacent pixel group selected by multiplexer 366 is placed on bit line [127] of the port B bus.

The memory 330 includes SRAM memory cells, precharge amplifiers, sense amplifiers, bias drivers, decoders, and latches (not shown), suitable circuits for which generally are well known in the art. The DPCM memory 130 also includes write buffer enable circuit 310 and timer circuit 312, suitable circuits for which are generally well known in the art. Terminal CLK is connected to the clock signal CLKDM.

The DPCM memory 130 is addressed by address generator 120 over two 12 bit address buses carrying, respectively, port A address DMADRA [11:3] and port B address DMADRB [11:3]. Note that for a memory write, the port A address and the port B address are set equal. The address fields from address generator 120 carried on the two 12 bit address buses DMADRA and DMADRB are as follows. DMADR [10:5] addresses one of the 36 pages of memory. The low order addresses selected pages at the top of the memory, and the high order addresses select pages at the bottom of the memory. Upon access, 5.times.64 bits of data are selected. DMADR [11,4,3] addresses one of the five banks of the page previously selected by DMADR [10:5]: [000] selects bank 0, [001] selects bank 1, [010] selects bank 2, [011] selects bank 3, and [100] selects bank 4. DMADR [2:0] and the node signal XPOS.sub.—ON selects any pixel, which serves as the beginning pixel of a 64 bit data stream containing eight consecutive pixels, from zero to seven, left to right. Known as PRAM addressing, this addressing is described more fully in the context of the illustrative shifter 400, below. The write port W is addressable only by ADDR [11:1], so that while PRAM addressing is not provided on write port W, a write in 16 or 64 bit segments is supported.

The DPCM memory 130 is addressable in two ways. Datapath access to the DPCM memory 130 is supported as 128-bit reads from port A and port B, and a 16 or 64 bit write to port W. I/O access to DPCM memory 130 is a 16 bit read from port B through shifter 144, ALU 154 in pass through mode, and multiplexer 126; and a 16 bit write to port W. During an I/O read or write, the beginning address is formed by setting address bit [11:1] as the beginning address.

An illustrative funnel shifter and transposer 404 suitable for use as shifters 140 and 144 is shown in FIG. 11. The input of the illustrative funnel shifter and transposer 404 is 128-bits, arranged as 16 pixels from either port A or port B of the DPCM memory 130. The 64 most significant bits are denoted the left input IN.sub.—L [63:0]. The left side input is further separated into pixels IN.sub.—L [63:56], IN.sub.—L [55:48], IN.sub.—L [47:40], IN.sub.—L [39:32], IN.sub.—L [31:24], IN.sub.—L [23:16], IN.sub.—L [15:8], and IN.sub.—L [7:0], denoted P, O, N, M, L, K, J and I respectively. The 64 least significant bits are denoted the right input IN.sub.—R [63:0]. The right side input is further separated into pixels IN.sub.—R [63:56], IN.sub.—R [55:48], IN.sub.—R [47:40], IN.sub.—R [39:32], IN.sub.—R [31:24], IN.sub.—R [23:16], IN.sub.—R [15:8], and IN.sub.—R [7:0], denoted A, B, C, D, E, F, G and H respectively. The left and right side pixels are applied to eight 12:1 multiplexers 406, 408, 410, 412, 414, 416, 418 and 420 in the order shown in FIGS. 11B–11E. The select inputs of the multiplexers 406, 408, 410, 412, 414, 416, 418 and 420 are connected to the output of a decoder 405, which decodes the address segment DMADR [2:0]. This arrangement supports PRAM addressing and transposition.

PRAM addressing is done with the arrangement of FIGS. 11A–11D in conjunction with the DPCM memory 130. PRAM addressing, which is useful for implementing motion estimation algorithms, involves the selective shifting from zero to seven pixels to the left on a pixel boundary in accordance with a segment of the address for the DPCM memory 30. The left input IN.sub.—L[63:0] and the right input IN.sub.—R[63:0] are applied to the funnel shifter network 404. The address segment DMADR [2:0] selects any pixel to be the beginning pixel of a 64 bit data stream containing eight consecutive pixels, from zero to seven, left to right. Table 1 following lists the output FS[63:0] as obtained from the input IN.sub.—L[63:0] and IN.sub.—R [63:0] in terms of pixels A–P.

TABLE 1

| MUX SELECT | DATA OUT | COMMENT |
| --- | --- | --- |
| 0 | P O N M L K J I | Pass Through Mode |
| 1 | O N M L K J I A | Shift Left 1 |
| 2 | N M L K J I A B | Shift Left 2 |
| 3 | M L K J I A B C | Shift Left 3 |
| 4 | L K J I A B C D | Shift Left 4 |
| 5 | K J I A B C D E | Shift Left 5 |
| 6 | J I A B C D E F | Shift Left 6 |
| 7 | I A B C D E F G | Shift Left 7 |

Figure 12:
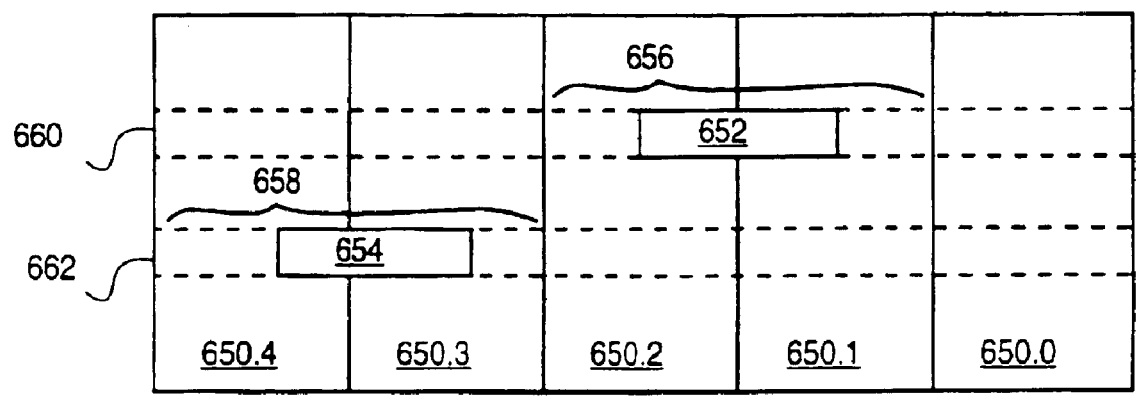
FIG. 12 is a schematic representation of the pixel-group random access memory of FIG. 9 useful in explaining the operation of the funnel shifter of FIG. 11.

FIG. 12 is a pictorial representation useful in explaining the particular implementation of PRAM addressing by the DPCM memory 130 in conjunction with the shifters 140 and 144. In order to read the pixel groups 652 and 654, a port A address 660 and a port B address 662 are furnished to the DPCM memory 130. In FIG. 12, the port A and port B addresses are different, although they could in some operations be the same address. Banks 650.2 and 650.1 are read from port A of DPCM memory 130 as a 2N data item 656, while banks 650.4 and 650.3 are read from port B of DPCM memory 130 as a 2N data item 658. In FIG. 12, port A and port B receive data from different banks, although they could in some operations receive data from the same banks or from an overlapping bank.

The N pixel data item 652 is extracted from the 2N data item 656 in shifter 140, while the N pixel data item 654 is extracted from the 2N data item 658 in shifter 144. Data items 652 and 654 are combined as a 16 pixel data item and furnished to the ALU 154.

The illustrative funnel shifter 404 is also capable of performing transposition operations. Transposition is not used in motion estimation and the circuit elements for performing transposition may be omitted from the shifters 140 and 144. Nevertheless, transposition is useful in the first half of a parallel two dimensional discrete cosine transform operation, prior to performing the second half of a DCT operation in a vision processor. The use of the illustrative shifter 404 with the transposition circuit elements in such a vision processor allows the same circuit wiring to be shared, thereby saving chip area.

In a transposition operation, the 128-bit or eight 16-bit word data, which as shown in FIGS. 4 and 8 is the output from the RF memory 134, the circuit 404 is responsive to the address segment DMADR [2:0] and the mode signal XPOS.sub.—ON, which are applied to the select inputs of the multiplexers 406, 408, 410, 412, 414, 416, 418 and 420 through the decoder 405, in accordance with Table 2 following.

TABLE 2

| MUX SELECT | DATA OUT | COMMENT |
| --- | --- | --- |
| 8 | P O N M L K J I | WXYZ Pass Through Mode |
| 9 | N M A B J I E F | XWZY |
| 10 | L K J I A B C D | YZWX |
| 11 | J I L K C D A B | ZYXW |

Figure 13:
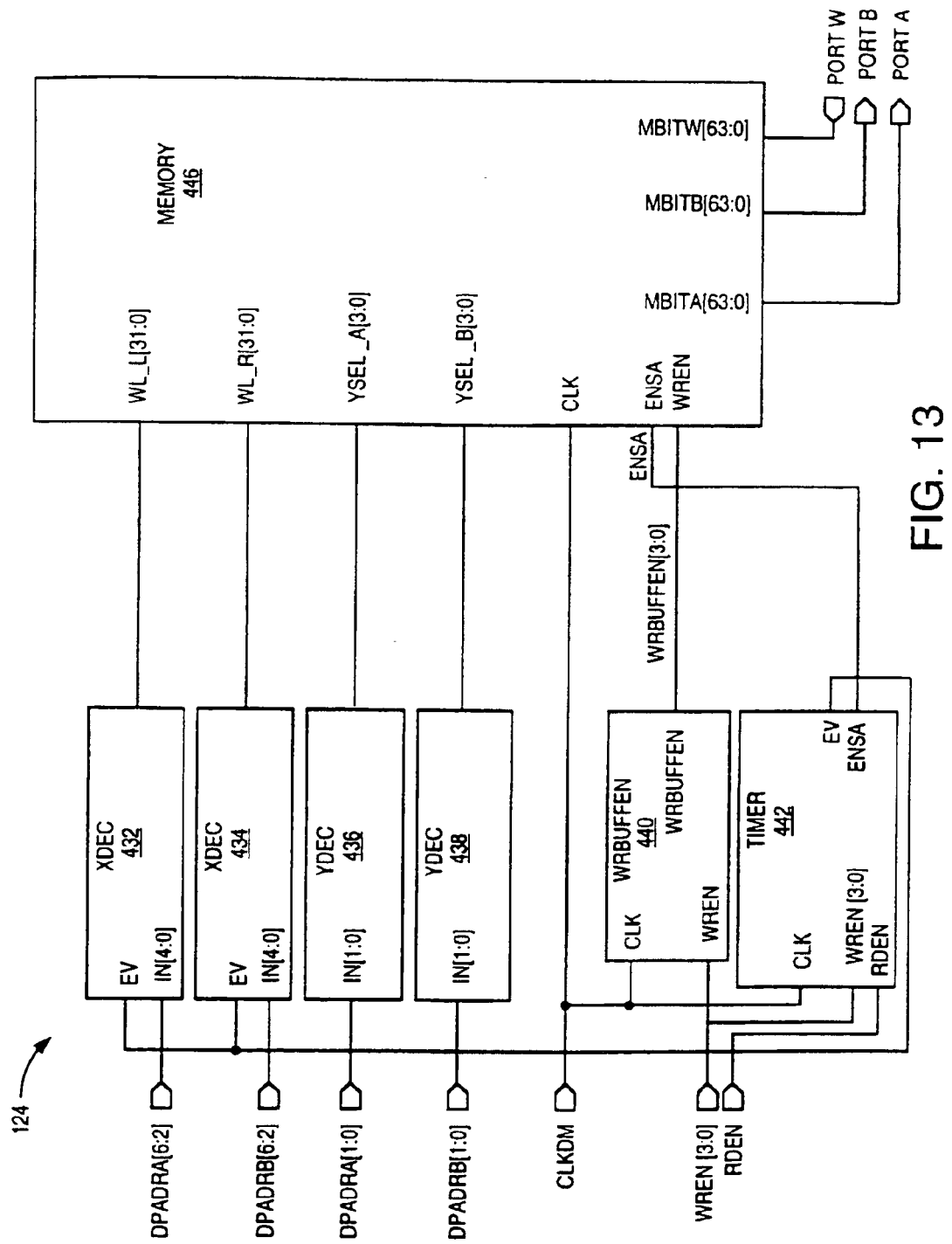
FIG. 13 is a block schematic diagram of another memory useful in the datapath of the architecture of FIG. 2.

The DP memory 124 illustrated in FIG. 13 is basically similar to the DPCM memory 130, but lacks PRAM addressing capability. The SRAM memory array 446 is designed to support two reads from different array locations in the same cycle. The SRAM memory 446 includes suitable memory cells, precharge circuits, sense amplifiers, bias drivers, decoders, and latches similar to those used in the DPCM memory 130. The DP memory 124 also includes write buffer enable circuit 440 and timer circuit 442, suitable circuits for which are generally well known in the art.

Some notable differences do exist, however. Memory array 446 is configured with four banks of 32.times.64 bit SRAM memory. The DP memory 124 is addressed by address generator 120 over two 7 bit address buses carrying, respectively, port A address DPADRA [6:0] and port B address DPADRB [6:0]. The address fields from address generator 120 carried on the two 7 bit address buses are as follows. ADDR [6:2] addresses one of the 32 pages of memory. The low order addresses selected pages at the top of the memory, and the high order addresses select pages at the bottom of the memory. Upon access, 4.times.64 bits of data are selected. DPADR [1:0] addresses one of the four banks of the page previously selected by DPADR [6:2]: [00] selects bank 0, [01] selects bank 1, [10] selects bank 2, and [11] selects bank 3.

The DP memory 124 is accessible in two ways. Datapath access to DP memory 124 is 64 bit (8 pixel) reads from port A and port B, and a 64 bit (8 pixel) write to port W. I/O access to DP memory 124 is a 16 bit (2 pixel) read from port B through multiplexer 126 (FIG. 2), and a 16 bit (2 pixel) write to port W. During an I/O read or write, the beginning address is formed by appending two more bits to the least significant position of address [6:0], which bits are applied to the multiplexer 126. Left to right position of 64 bit data is addressed as 00, 01, 10, 11 in 16 bit chunks by these additional appended bits.

An illustrative ALU 154 is illustrated in FIG. 14. Generally, ALU 154 performs addition, subtraction or averaging of two operandi A and B in one cycle. The addition is performed to either 16 or 8 bit precision, depending on whether the operandi consist of sixteen eight-bit data items (pixels), or eight sixteen-bit data items (words). The ALU 154 is laid out as two similar 8-pixel or 4-word ALU sections 154.1 and 154.2, which are essentially identical. Each of the ALU sections 154.1 and 154.2 comprises four essentially identical configurable ALU units; as shown in FIG. 14, ALU section 154.1 comprises ALU units 500.1, 500.2, 500.3 and 500.4. The units 500 are substantially identical to one another; a representative unit 500.1 is shown in detail.

The unit 500.1 comprises two arithmetic units 510 and 520. The arithmetic unit 510 comprises a full adder 512 for determining a sum of the pixels A[7:0] and B[7:0], and a full subtractor 514 for determining a difference of the pixels A[7:0] and B[7:0] and the difference plus one. The difference plus one output of the subtractor 514 is inverted by inverter 517, and applied along with the difference output to the multiplexer 518. Either the difference or the inverted difference plus one is selected in accordance with the sign bit on the difference output of the subtractor 514, and the selected quantity is provided as the absolute difference output .vertline.A–B.vertline.[7:0]. The output of the adder 512 is furnished to circuit 515, which is a shifter that operates either as a pass through circuit or as a divide by two circuit depending on the state of the averaging mode signal A.sub.—MODE. The output of the circuit 515 is applied along with the (A–B) output of the subtractor 514 as inputs to multiplexer 516, which selects one of the inputs in accordance with the state of the sum/difference mode signal S/D.sub.—MODE. Hence, output X furnishes either (A+B) [7:0], (A–B)[7:0], or (A+B)/2[7:0]. Suitable circuits for the various adders, multiplexers and shifters of FIG. 14 are generally well known in the art.

The elements of arithmetic unit 520 are analogous to the elements of the arithmetic unit 510, except that the adder 522 of the arithmetic unit 520 receives through multiplexer 530 an input from the carry out of the adder 512 in the arithmetic unit 510, and the subtractor 524 of the arithmetic unit 520 receives through multiplexer 532 an input from the carry out of the subtractor 514 in the arithmetic unit 510. In pixel mode, each of the arithmetic units 510 and 520 operate independently. Multiplexers 530 and 532 are responsive to the state of the pixel/word mode bit P/W.sub.—MODE to select a logic ZERO for application as the carry to the full adder 522 and the full subtractor 524. In word mode, the arithmetic units 510 and 520 are linked. Multiplexers 530 and 532 are responsive to the state of the pixel/word mode bit P/W.sub.—MODE to select the carry output of the full adder 512 for application to the carry input of the full adder 522, and to select the carry output of the full subtractor 514 for application to the carry input of the full subtractor 524.

The outputs of the arithmetic sections 510 and 520 are combined to furnish outputs X[15:0] and .vertline.A–B.vertline.[15:0] of the ALU unit 500.1 (outputs (A+B) [15:0] and (A–B)[15:0] are not utilized in motion estimation). The outputs of all ALU units in the sections 154.1 and 154.2 are combined to furnish outputs X[127:0] and .vertline.A–B.vertline.[127:0] of the ALU 154 (outputs (A+B)[127:0] and (A–B)[127:0] are not utilized in motion estimation).

Another mode supported by the ALU 154 is a pass through mode. The pass through mode essentially sets operand B to zero so that the operand A is unaffected by any arithmetic operations. Pass-through mode is implemented in the ALU unit 500.1 with AND gates 511 and 521, which are responsive to the pass-through mode bit PT.sub.—MODE, in the bit lines B[7:0 and B[15:8].

The tree adder 156 (FIG. 2) is used to perform the summation of the difference of 16 pixels at one time received from ALU 154. Tree adders are well known in the art. The output of the tree adder 156 is read by the controller 102 and stored in register RR24.

While the invention has been described with respect to the embodiments set forth above, other embodiments and variations not described herein may be within the scope of the invention. For example, the invention is advantageous fabricated with any suitable 1 micron CMOS process, although it is not to be considered limited to any particular fabrication technology. Generally, the present invention in its broadest terms is not to be considered limited to any particular memory size, bank arrangement, pixel size, word size, or pixel group size, as specific values depend on the characteristics desired of the architecture. Accordingly, other embodiments, variations and improvements not described herein may be within the scope of the invention, which is defined by the following claims.

We claim:

1. An apparatus for performing an arithmetic operation on groups of pixels under program control, comprising:
a first memory having a first read port and a plurality of addressable locations N pixels in width and M rows in height, wherein X pixels from any one of said addressable locations are accessible in parallel on said first read port during an address cycle, X being at least N;
a second memory having a second read port and a plurality of addressable locations greater than N pixels in width and at least M rows in height, wherein any X contiguous pixels, arranged N pixels in width and M rows in height, from any one of said addressable locations are accessible in parallel on said second read port during an address cycle; and
an arithmetic unit having a first operand input port coupled to said first read port, a second operand input port coupled to said second read port, and an output.

2. An apparatus as in claim 1, wherein said second memory comprises:
a memory array having a plurality of addressable locations N pixels in width and a third read port, wherein X pixels from any one of said addressable locations and X pixels from an adjacent addressable location are accessible in parallel on said third read port during an address cycle; and
a shifter having an input port coupled to said third read port and an output port N pixels in width, said shifter output port being said second read port.

3. An apparatus as in claim 2, wherein said shifter is adapted to perform from zero to N-1 shifts on a pixel boundary.

4. An apparatus as in claim 1, further comprising a controller coupled to said first memory by a first address bus, and coupled to said second memory by a second address bus, said controller being under microcode control.

5. An apparatus as in claim 1, further comprising a controller coupled to said first memory by a first address bus, and coupled to said second memory by a second address bus, said controller being under software control.

6. An apparatus as in claim 1, further comprising a state machine coupled to said first memory by a first address bus, and coupled to said second memory by a second address bus.

7. An apparatus as in claim 1, wherein said arithmetic unit comprises a subtractor circuit receiving a first and second operandi so that pixel differences are determinable in parallel.

8. An apparatus as in claim 1, wherein said arithmetic unit comprises an absolute difference circuit receiving a first and second operandi, further comprising an adder coupled to the output port of said arithmetic unit so that a sum of absolute pixel differences is determinable in parallel.

9. An apparatus as in claim 8, wherein said adder is a tree adder.

10. An apparatus as in claim 1, wherein said arithmetic unit comprises an averager circuit receiving a first and second operandi so that pixel averages are determinable in parallel.

11. An apparatus as in claim 1, wherein the arithmetic unit comprises an absolute difference circuit receiving the first and second operandi.

12. An apparatus as in claim 1, wherein the first memory stores a plurality of pixels defining a time t digital video image block having a frame location, and the second memory stores a plurality of pixels defining a time t-1 digital video search window having a frame location approximately centered on the frame location of the digital image block.

13. An apparatus for performing an arithmetic operation on groups of pixels under program control, comprising:
a memory having a plurality of addressable locations greater than N pixels in width and first and second read ports, wherein any N contiguous pixels from any two of said addressable locations are accessible in parallel on each of said first and second read ports during an address cycle; and
an arithmetic unit having a first operand input port coupled to said first read port, a second operand input port coupled to said second read port, and an output.

14. An apparatus as in claim 13, wherein said memory comprises:
a memory array having a plurality of addressable locations N pixels in width, a third read port, and a fourth read port, wherein N pixels from any one of said addressable locations and N pixels from an adjacent addressable location are accessible in parallel on each of said third and fourth read ports during an address cycle; and
a first shifter having an input port coupled to said third read port and an output port N pixels in width, the output port of said first shifter being said first read port;
a second shifter having an input port coupled to said fourth read port and an output port N pixels in width, the output port of said second shifter being said second read port.

15. An apparatus as in claim 14, wherein said first and second shifters are adapted to perform from zero to N-1 shifts on a pixel boundary.

16. An apparatus as in claim 13, further comprising a controller coupled to said memory by an address bus, said controller being under microcode control.

17. An apparatus as in claim 13, further comprising a controller coupled to said memory by an address bus, said controller being under software control.

18. An apparatus as in claim 13, further comprising a state machine coupled to said memory by an address bus.

19. An apparatus as in claim 13, wherein said arithmetic unit comprises a subtractor circuit receiving a first and second operandi so that pixel absolute differences are determinable in parallel.

20. An apparatus as in claim 13, wherein said arithmetic unit comprises an absolute difference circuit receiving a first and second operandi, further comprising an adder coupled to the output port of said arithmetic unit so that a sum of pixel differences is determinable in parallel.

21. An apparatus as in claim 20, wherein said adder is a tree adder.

22. An apparatus as in claim 13, wherein said arithmetic unit comprises an averager circuit receiving a first and second operandi so that pixel averages are determinable in parallel.

23. A method for performing an arithmetic operation on pixel operandi of width N, comprising the steps of:
storing a block of pixels in a memory having a plurality of addressable locations M pixels in width, M being greater than N;
selecting a first group of any N contiguous pixels in parallel from any one of said addressable locations of said memory during an address cycle;
selecting a second group of any N contiguous pixels in parallel from any one of said addressable locations of said memory during said address cycle;
performing an arithmetic operation wherein a first operand is from said first group of pixels and a second operand is from said second group of pixels.

24. An apparatus for performing an arithmetic operation including two blocks of pixels, comprising:
- a first memory having a first read port and a plurality of addressable locations for storing a plurality of pixels arranged in a first pixel block, wherein the first pixel block has a width of N pixels, and the plurality of pixels are accessible in parallel on the first read port during an address cycle;
- a second memory having a second read port and a plurality of addressable locations for storing a plurality of pixels arranged in a second pixel block, wherein the second pixel block has a width of greater than N pixels, and any block of contiguous pixels having a width of N pixels from the second pixel block are accessible in parallel on the second read port during an address cycle; and
- an arithmetic unit having a first operand input port coupled to the first read port, a second operand input port coupled to the second read port, and an output.

25. An apparatus as in claim 24, wherein the first memory stores a plurality of pixels defining a time t digital video image block having a frame location, and the second memory stores a plurality of pixels defining a time t-1 digital video search window having a frame location approximately centered on the frame location of the digital image block.

26. An apparatus as in claim 24, wherein the first pixel block has a height of M pixels and any block of contiguous pixels from the second pixel block has a height of M pixels.

27. An apparatus as in claim 24, wherein the arithmetic unit comprises a comparator circuit receiving a first operand on the first operand import port and a second operand on the second operand input port such that differences between the first and second operandi are determinable in parallel for each pixel.

28. An apparatus as in claim 24, wherein the arithmetic unit comprises a subtractor circuit receiving the first and second operandi so that pixel differences are determinable in parallel.

29. An apparatus as in claim 24, wherein the arithmetic unit comprises a subtractor circuit receiving the first and second operandi so that pixel differences are determinable in parallel.

* * * * *